(12) United States Patent
Ichida et al.

(10) Patent No.: US 6,734,376 B2
(45) Date of Patent: May 11, 2004

(54) ELECTRICAL SWITCH DEVICE FOR BICYCLE

(75) Inventors: Tadashi Ichida, Ikoma (JP); Koken Ueno, Sakai (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 10/173,829

(22) Filed: Jun. 19, 2002

(65) Prior Publication Data

US 2003/0234163 A1 Dec. 25, 2003

(51) Int. Cl.⁷ .................... H01H 9/00; H01H 21/00
(52) U.S. Cl. ............... 200/4; 200/61.85; 200/553; 200/557; 200/332.2; 200/339
(58) Field of Search .................. 200/4, 6 R, 6 B, 200/17 R, 18, 61, 54, 61.85, 553, 556, 557, 517, 558, 561, 332.2, 339

(56) References Cited

U.S. PATENT DOCUMENTS

| | | | |
|---|---|---|---|
| 3,591,747 A | 7/1971 | Dennison | 200/153 |
| 3,746,809 A | 7/1973 | Gaber | 200/67 G |
| 4,072,204 A * | 2/1978 | Leighton et al. | 180/205 |
| 4,099,159 A * | 7/1978 | Windisch | 340/432 |
| 4,169,972 A | 10/1979 | Black, III et al. | 200/153 H |
| 5,285,039 A | 2/1994 | Satoh | 200/563 |
| 5,796,057 A | 8/1998 | Nakajima et al. | 200/6 B |
| 5,803,243 A * | 9/1998 | Nestor et al. | 200/556 |
| 5,862,714 A * | 1/1999 | Fujimoto | 74/527 |
| 5,923,007 A * | 7/1999 | Emmert | 200/5 R |
| 6,015,036 A | 1/2000 | Fukuda | 192/217 |
| 6,073,061 A | 6/2000 | Kimura | 701/1 |
| 6,130,393 A * | 10/2000 | Chu | 200/556 |
| 6,367,833 B1 | 4/2002 | Horiuchi | 280/760 |
| 6,380,731 B1 | 4/2002 | Nishimoto | 324/173 |
| 6,462,292 B1 * | 10/2002 | Wang | 200/315 |

FOREIGN PATENT DOCUMENTS

| | | | |
|---|---|---|---|
| EP | 1 129 937 A2 | 9/2001 | B62M/25/04 |
| JP | 63-199435 U | 12/1988 | H01H/23/16 |
| JP | 4-38822 U | 4/1992 | B60J/7/057 |
| JP | 5-31069 U | 4/1993 | H01H/23/00 |
| JP | 11-111117 A | 4/1999 | H01H/23/16 |
| JP | 2000-108981 A | 4/2000 | B62M/25/08 |

* cited by examiner

Primary Examiner—Michael A. Friedhofer
(74) Attorney, Agent, or Firm—Shinjyu Global IP Counselors, LLP

(57) ABSTRACT

An electrical switch or operating device is disclosed for controlling/operating an electrically controlled bicycle component. In one embodiment, the operating device controls/operates a bicycle shift device and a bicycle suspension. The operating device has a base portion, a toggle portion, a button portion, three electrical contact switches, and a clicking mechanism. The clicking mechanism is positioned in a manner to provide for a compact arrangement of the operating device. The toggle portion is pivotally mounted to the base portion to move from a toggle neutral position to first or second contact positions where the toggle portion depresses either the first or electrical contact switches. The button portion is movably coupled to the toggle portion between a button neutral position where the button portion is spaced from the third electrical contact switch and a third contact position where the button portion depresses the third electrical contact switch.

32 Claims, 23 Drawing Sheets

ELECTRICAL SWITCH DEVICE FOR BICYCLE

BACKGROUND OF THE INVENTION

1. Field of the Invention

This invention generally relates to an electrical switch device. More specifically, the present invention relates an electrical switch that is used with electronically controlled components of a bicycle.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. Specifically, manufacturers of bicycle components have been continually improving performance, reliability and appearance of the various components.

Recently, bicycle components have become electronically controlled so as to increase the performance of the bicycle and the ease of operating the bicycle. In particular, bicycles have been provided with an electronic drive train for smoother shifting and electronically controlled suspensions for a smoother ride. Many times, these electronically controlled bicycle components allow for the rider to at least partially select various modes of operations.

In the case of electronic drive trains, the bicycle can be provided with a rear shifting device and/or a front shifting device. These electronic shifting devices can take a variety of forms. For example, the rear shifting device of the electronic drive train can have a motorized internal rear hub or a rear multi-stage sprocket assembly with a motorized rear derailleur. In any case, the electronic shifting devices are typically electronically operated by a cycle computer for automatically and/or manually shifting of the electronic shifting devices.

The cycle computer is also often coupled to other components that are electrically controlled or operated. For example, some bicycles include electronically controlled suspension assemblies for adjusting the stiffness of the ride depending on a variety of factors.

The cycle computer uses one or more sensors to monitor various operations of the bicycle, such as speed, cadence, riding time and gear position, which are in turn used to electrically control or operate these electronic components. In this type of an arrangement, electrical wires or cords are utilized to transmit the electrical current to and from the various components and sensors. These electrical wires or cords are often connected to the components and/or sensors by electrical connectors.

These electronically controlled bicycle components are typically operated by an operating device that is mounted on the handlebar of the bicycle. The rider pushes a button and a motor is activated to operate the electronically controlled bicycle components. In the case of a derailleur, the rider pushes a button for completing a shift operation. In the case of a suspension assembly, the rider pushes a button for changing the stiffness of the ride. It is desirable to provide an operating device that is relatively easy to use without looking at the operating device and that is relatively compact.

In view of the above, there exists a need for an improved operating device for operating/controlling electronically controlled bicycle components. This invention addresses this need in the prior art as well as other needs, which will become apparent to those skilled in the art from this disclosure.

SUMMARY OF THE INVENTION

One aspect of the present invention is to provide an electrical operating device with a clicking mechanism in a manner that provides a compact arrangement of the operating device.

Another aspect of the present invention is to provide an electrical operating device for a bicycle that can control two electrical operating bicycle components.

Another object of the present invention is to provide an electrical operating device for a bicycle that relatively easy to use.

Another object of the present invention is to provide an electrical operating device that is relatively easy and inexpensive to manufacture.

In accordance with one aspect of the present invention, the foregoing objects can basically be attained by providing an electrical switch comprising a base portion, a first electrical contact switch, a toggle portion and a clicking mechanism. The first electrical contact switch is arranged relative to the base portion at a first location. The toggle portion is pivotally mounted to the base portion about a pivot axis between a toggle neutral position where the toggle portion is spaced from the first electrical contact switch and a first contact position where the toggle portion contacts the first electrical contact switch. The toggle portion has an upper operating surface, a lower switch contacting surface and a first end surface disposed between the upper operating surface and the lower switch contacting surface. The lower switch contacting surface is arranged to contact the first electrical contact switch upon movement of the toggle portion to the first contact position. The clicking mechanism is operatively formed between the second wall of the base portion and the toggle portion to indicate movement of the toggle portion from at least one of the toggle neutral position and the first contact position.

In accordance with another aspect of the present invention, the foregoing objects can basically be attained by providing an electrical switch comprising a base portion, a first electrical contact switch, a second electrical contact switch, a third electrical contact switch, a toggle portion and a button portion. The first electrical contact switch is arranged relative to the base portion at a first location. The second electrical contact switch is arranged relative to the base portion at a second location. The third electrical contact switch is arranged relative to the base portion at a third location. The toggle portion is pivotally mounted to the base portion about a pivot axis between a toggle neutral position where the toggle portion is spaced from the first and second electrical contact switches, a first contact position where the toggle portion contacts the first electrical contact switch and a second contact position where the toggle portion contacts the second electrical contact switch. The button portion is movably coupled to the toggle portion between a button neutral position where the button portion is spaced from the third electrical contact switch and a third contact position where the button portion contacts the third electrical contact switch.

In accordance with another aspect of the present invention, the foregoing objects can basically be attained by providing an electrically controlled bicycle shifting assembly comprising a bicycle shift device, a control unit and an operating device. The bicycle shift device is configured to move between at least two shift positions. The control unit is operatively coupled to the shift device to control movement of the shift device between at least two shift positions. The operating device is operatively coupled to the control unit to input a shift signal. The operating device includes a base portion, a first electrical contact switch, a toggle portion and a clicking mechanism. The first electrical contact switch is arranged relative to the base portion at a first location. The toggle portion is pivotally mounted to the base portion about a pivot axis between a toggle neutral position where the toggle portion is spaced from the first electrical contact switch and a first contact position where the toggle portion contacts the first electrical contact switch. The toggle portion has an upper operating surface, a lower switch contacting surface and a first end surface disposed between the upper operating surface and the lower switch contacting surface. The lower switch contacting surface is arranged to contact the first electrical contact switch upon movement of the toggle portion to the first contact position. The clicking mechanism is operatively formed between the second wall of the base portion and the toggle portion to indicate movement of the toggle portion from at least one of the toggle neutral position and the first contact position.

In accordance with another aspect of the present invention, the foregoing objects can basically be attained by providing an electrically controlled bicycle shifting assembly comprising a bicycle shift device, a control unit and an operating device. The bicycle shift device is configured to move between at least two shift positions. The control unit is operatively coupled to the shift device to control movement of the shift device between at least two shift positions. The operating device is operatively coupled to the control unit to input a shift signal. The operating device includes a base portion, a first electrical contact switch, a second electrical contact switch, a third electrical contact switch, a toggle portion and a button portion. The first electrical contact switch is arranged relative to the base portion at a first location. The second electrical contact switch is arranged relative to the base portion at a second location. The third electrical contact switch is arranged relative to the base portion at a third location. The toggle portion is pivotally mounted to the base portion about a pivot axis between a toggle neutral position where the toggle portion is spaced from the first and second electrical contact switches, a first contact position where the toggle portion contacts the first electrical contact switch and a second contact position where the toggle portion contacts the second electrical contact switch. The button portion is movably coupled to the toggle portion between a button neutral position where the button portion is spaced from the third electrical contact switch and a third contact position where the button portion contacts the third electrical contact switch.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
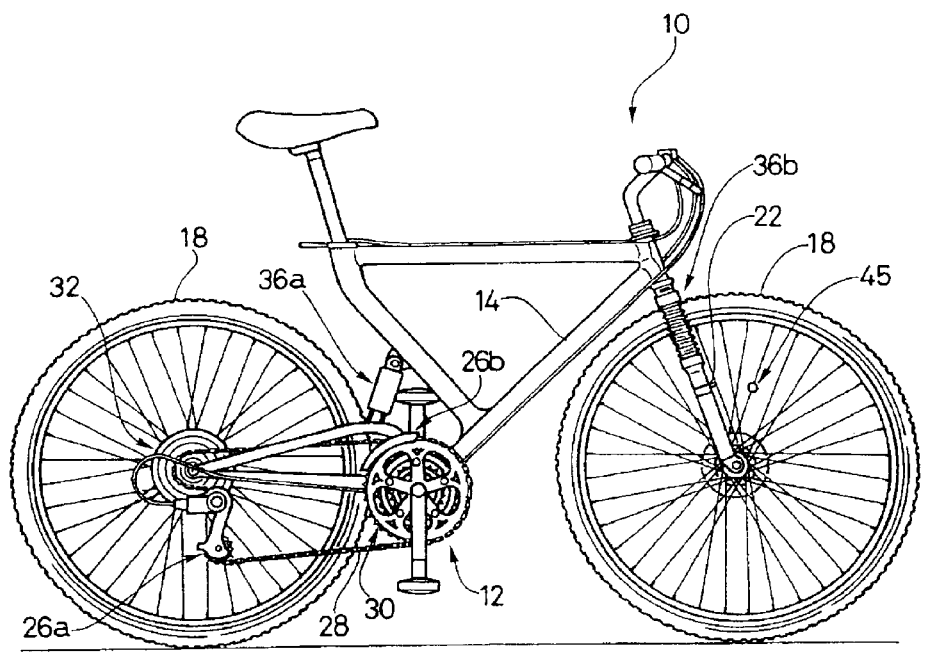
FIG. 1 is a side elevational view of a bicycle with a pair of operating devices that control/operate an electronically controlled drive train and an electronically controlled suspension in accordance with one embodiment of the present invention.
Figure 2:
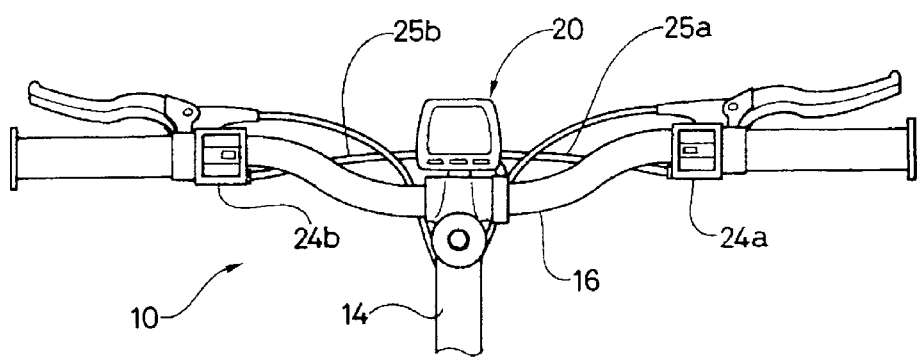
FIG. 2 is a top plan view of the handlebar portion of the bicycle illustrated in FIG. 1 with the shift control unit and the pair of operating devices coupled thereto in accordance with one embodiment of the present invention.
Figure 3:
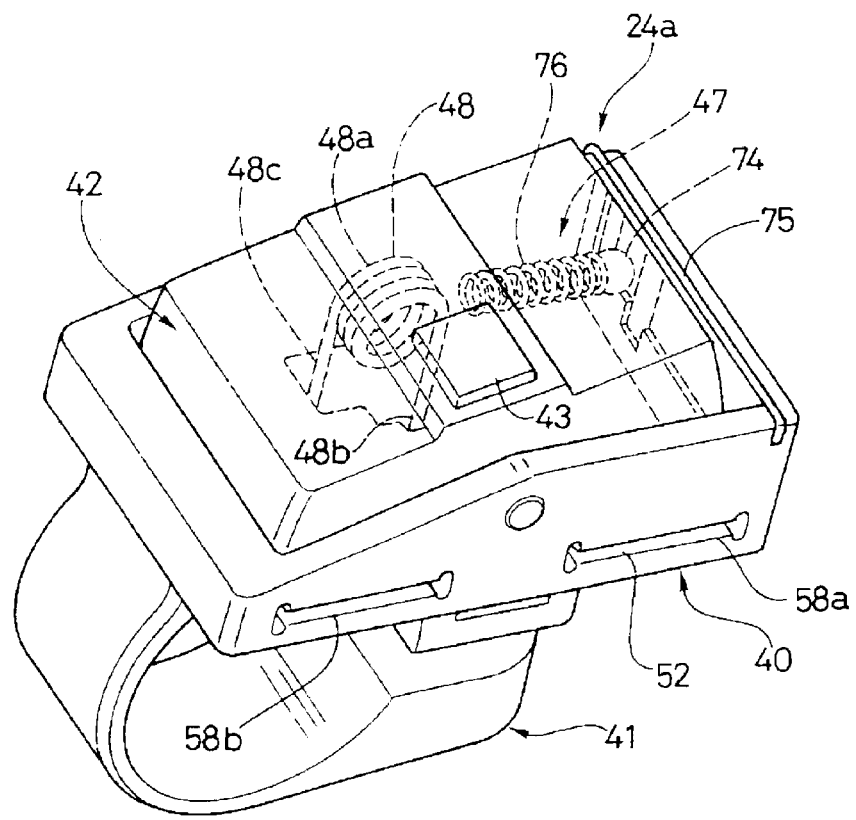
FIG. 3 is an enlarged perspective view of the right or rear operating device in accordance with the embodiment of the present invention that is illustrated in FIGS. 1 and 2.
Figure 4:
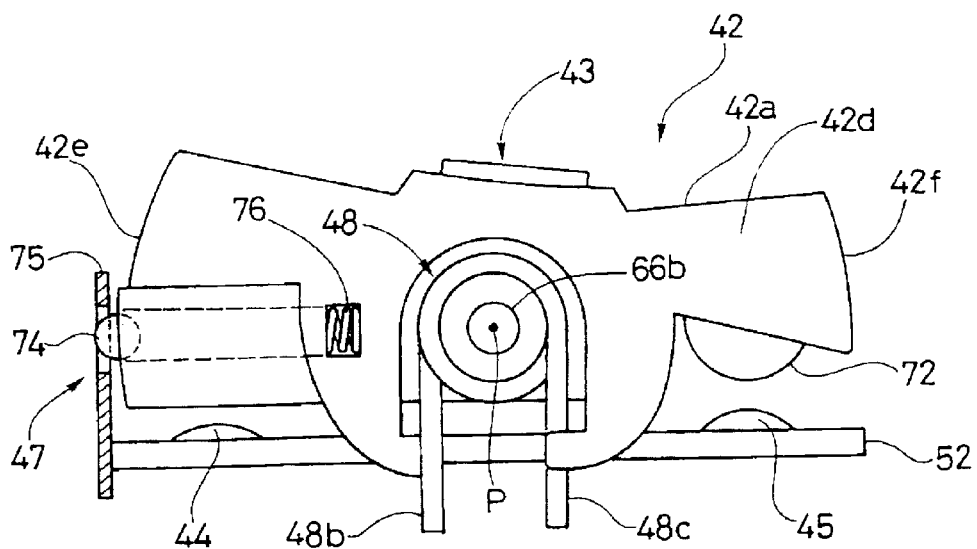
FIG. 4 is an enlarged diagrammatic side elevational view of the right or rear operating device illustrated in FIG. 3, when in the normal rest position (toggle neutral position and button neutral position)
Figure 5:
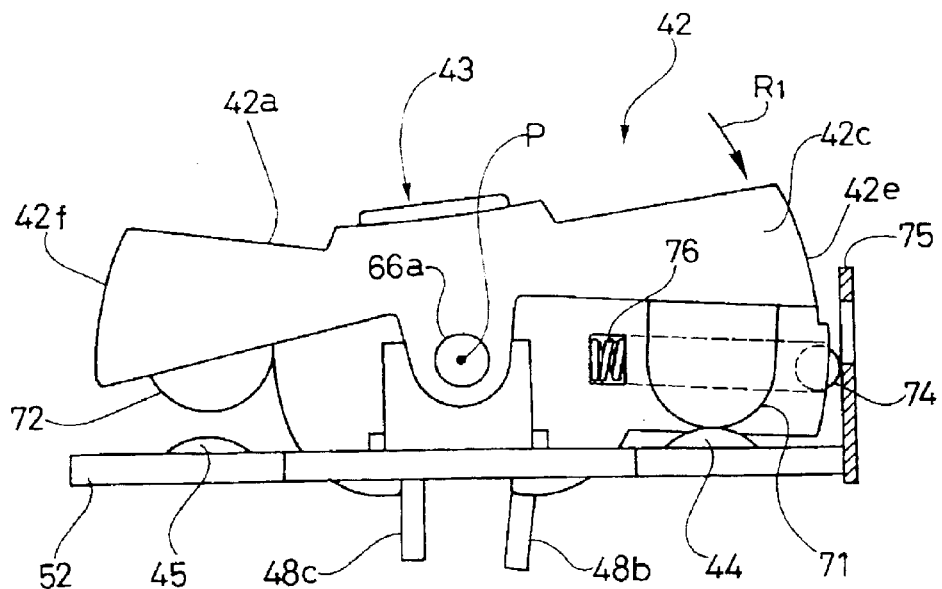
FIG. 5 is an enlarged diagrammatic side elevational view of the right or rear operating device illustrated in FIGS. 3 and 4, when the toggle potion has been pivoted to a first contact position.
Figure 6:
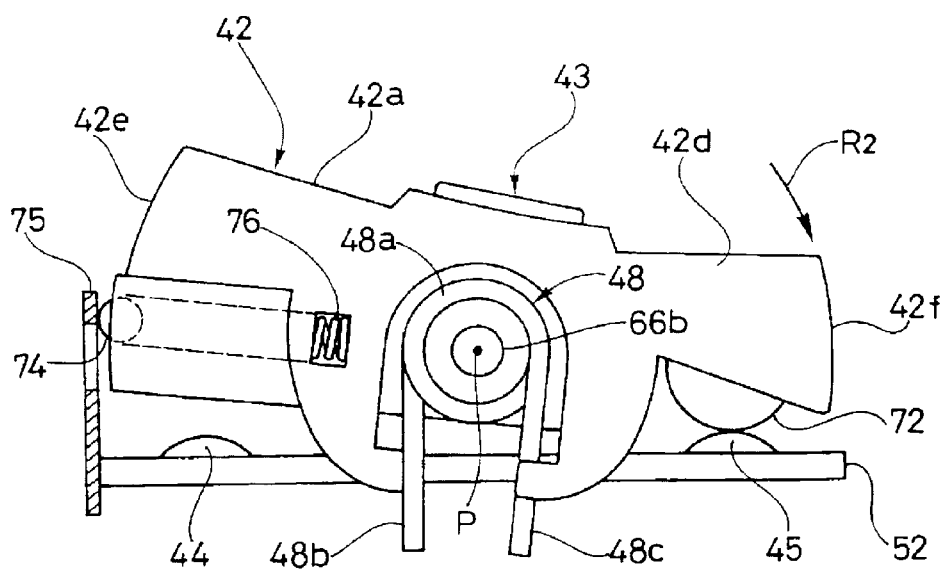
FIG. 6 is an enlarged diagrammatic side elevational view of the right or rear operating device illustrated in FIGS. 3–5, when in the toggle portion has been pivoted to a second contact position.
Figure 7:
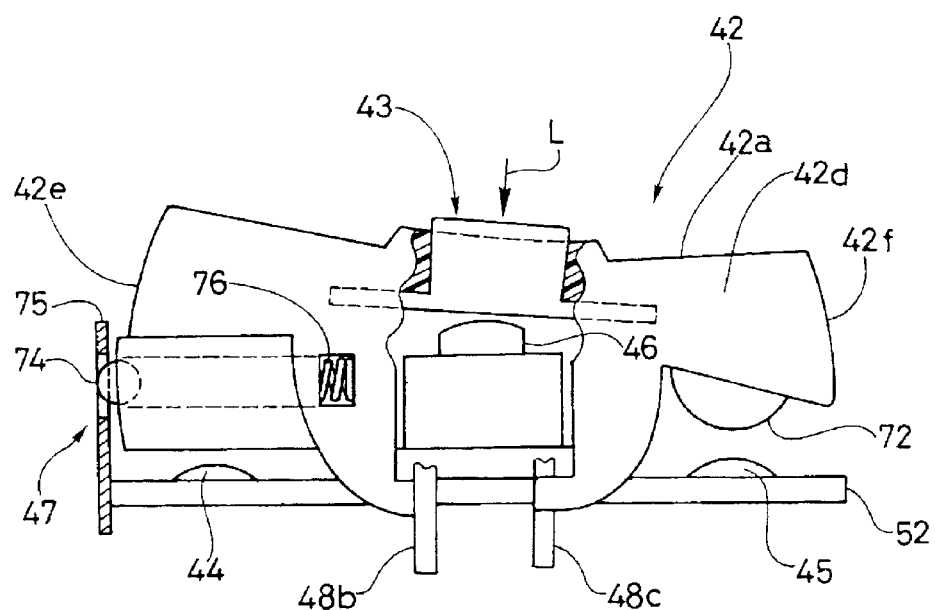
FIG. 7 is an enlarged diagrammatic side elevational view of the right or rear operating device illustrated in FIGS. 3–6, when the button portion has been depressed to a third contact position.
Figure 8:
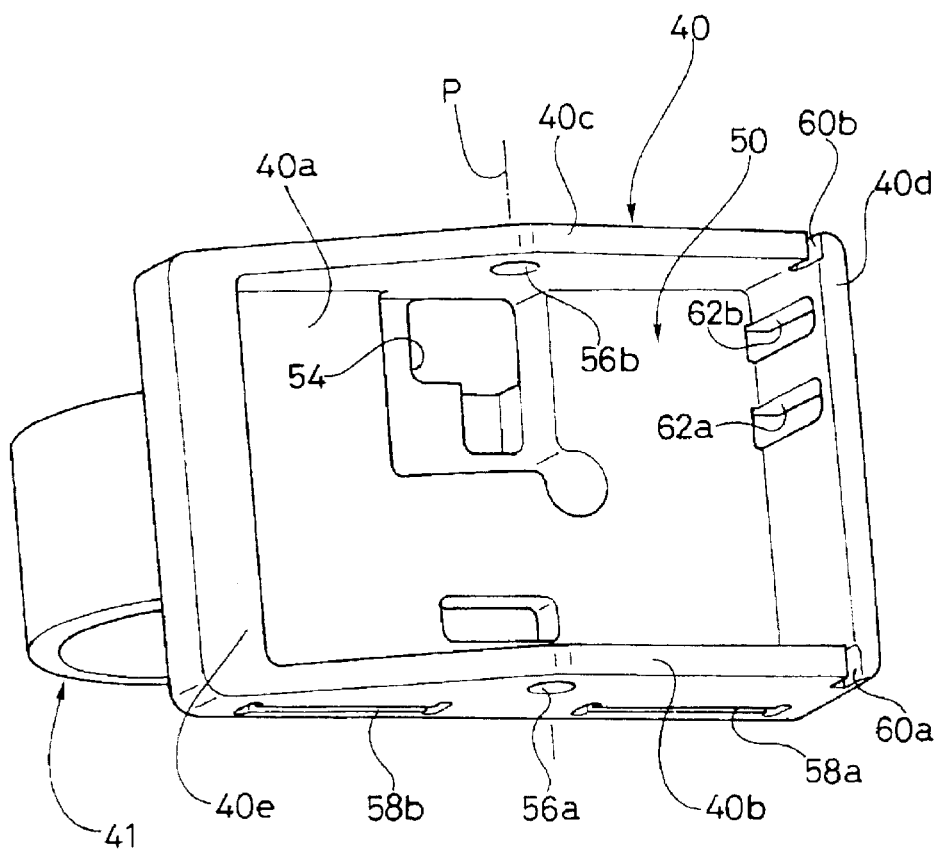
FIG. 8 is an enlarged perspective view of the base portion and the mounting portion for the right or rear operating device in accordance with the embodiment of the present invention that is illustrated in FIGS. 3–7.
Figure 9:
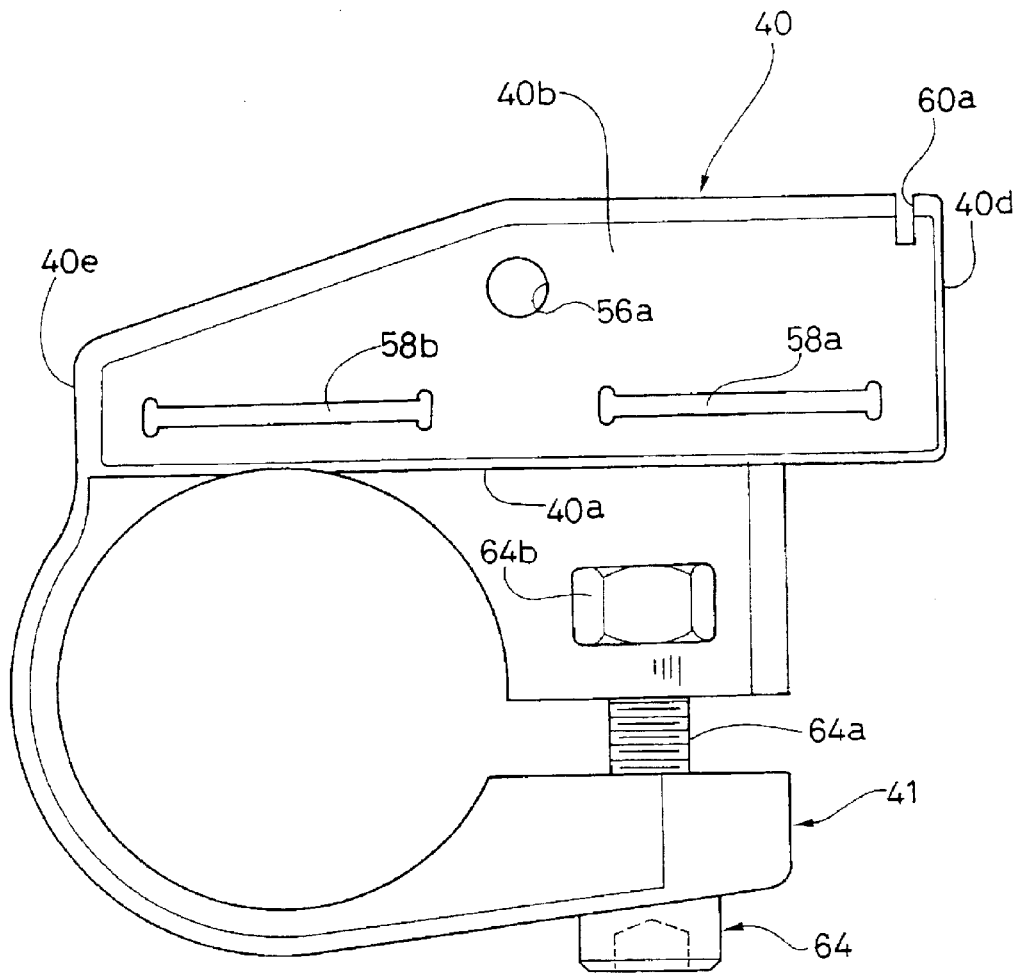
FIG. 9 is an enlarged right side elevational view of the base portion and the mounting portion illustrated in FIG. 8.
Figure 10:
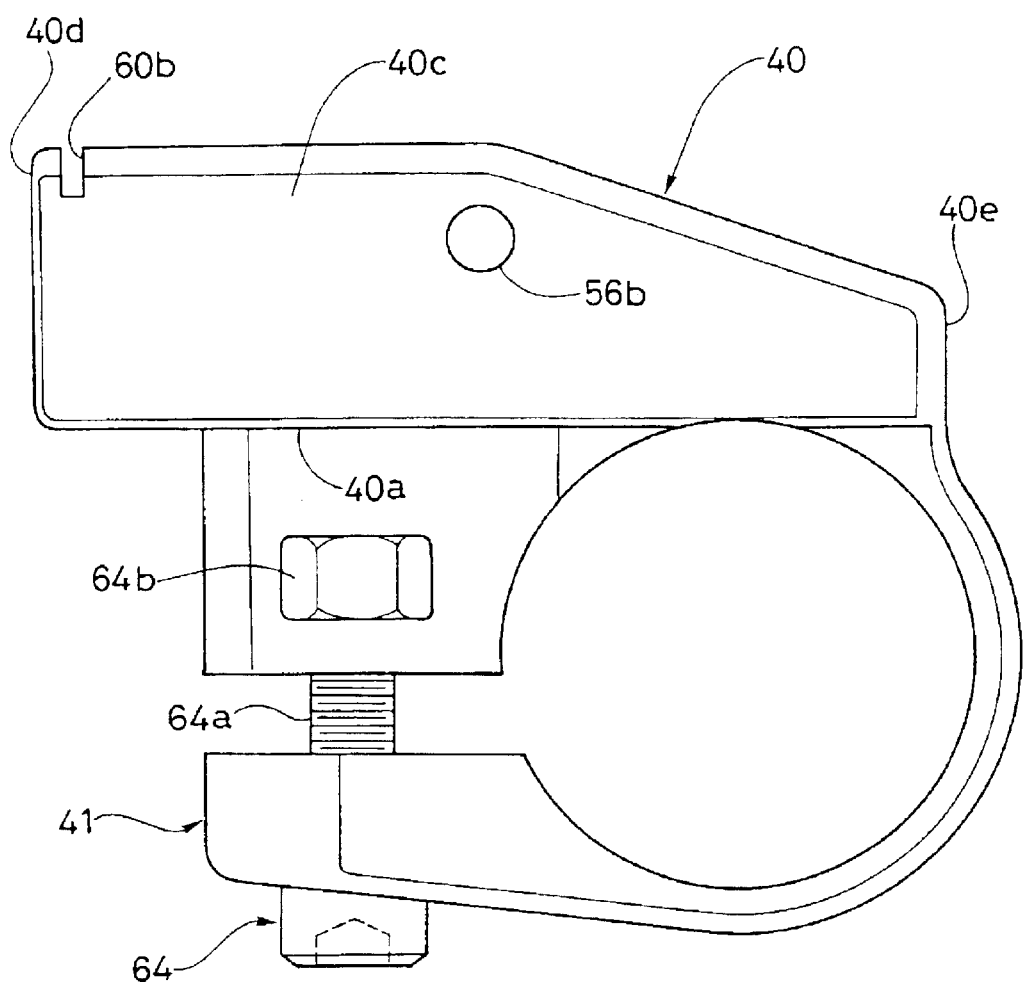
FIG. 10 is an enlarged left side elevational view of the base portion and the mounting portion illustrated in FIGS. 8 and 9.
Figure 11:
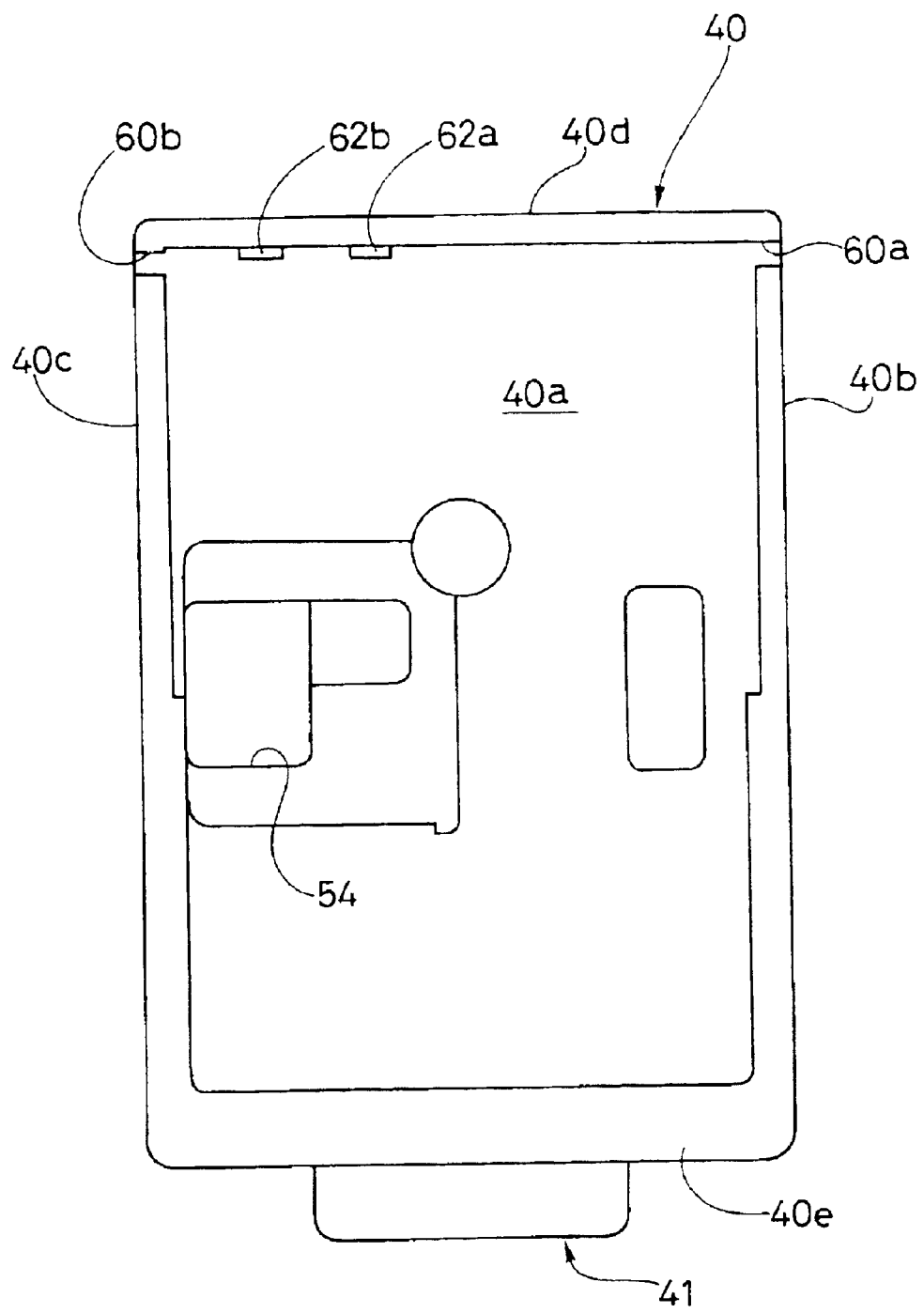
FIG. 11 is a top plan view of the base portion and the mounting portion illustrated in FIGS. 8–10.
Figure 12:
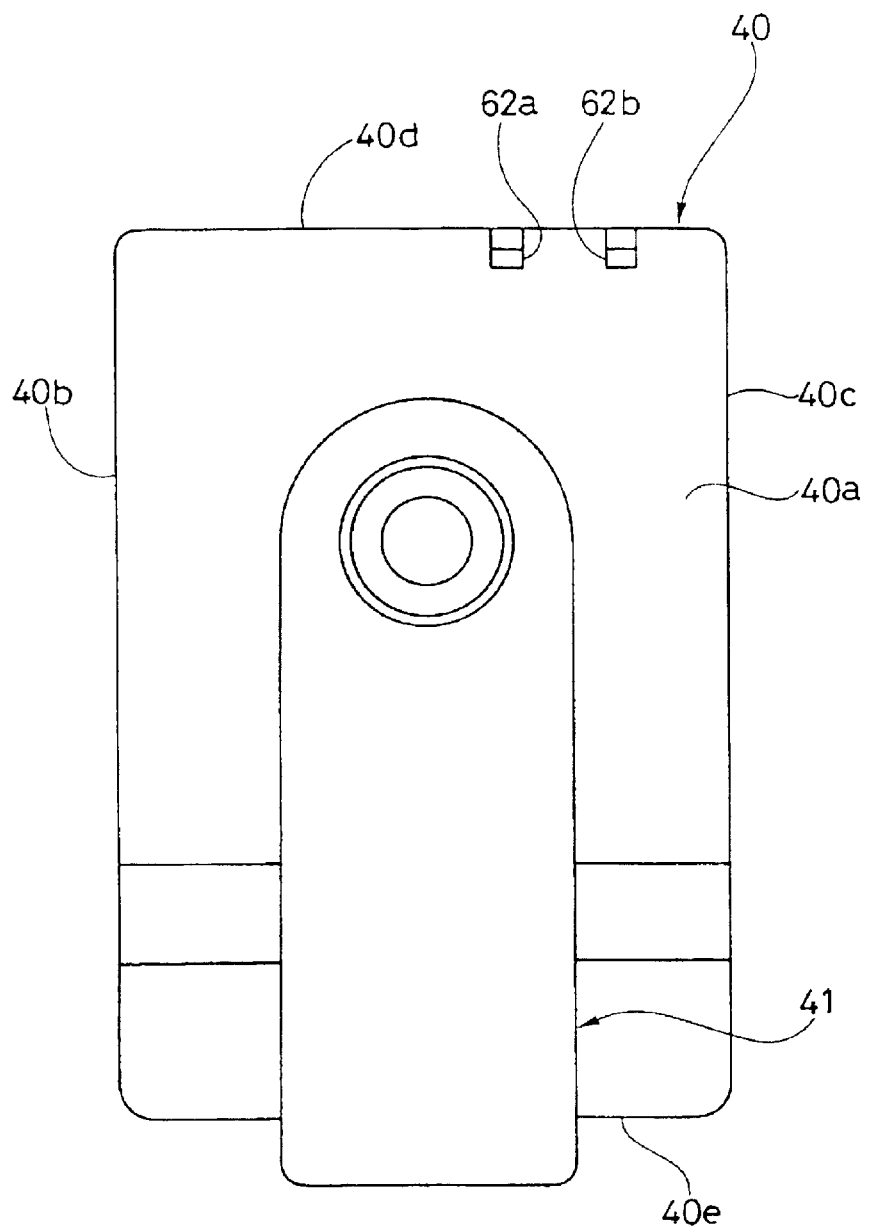
FIG. 12 is a bottom plan view of the base portion and the mounting portion illustrated in FIGS. 8–11, with the fastener removed.
Figure 13:
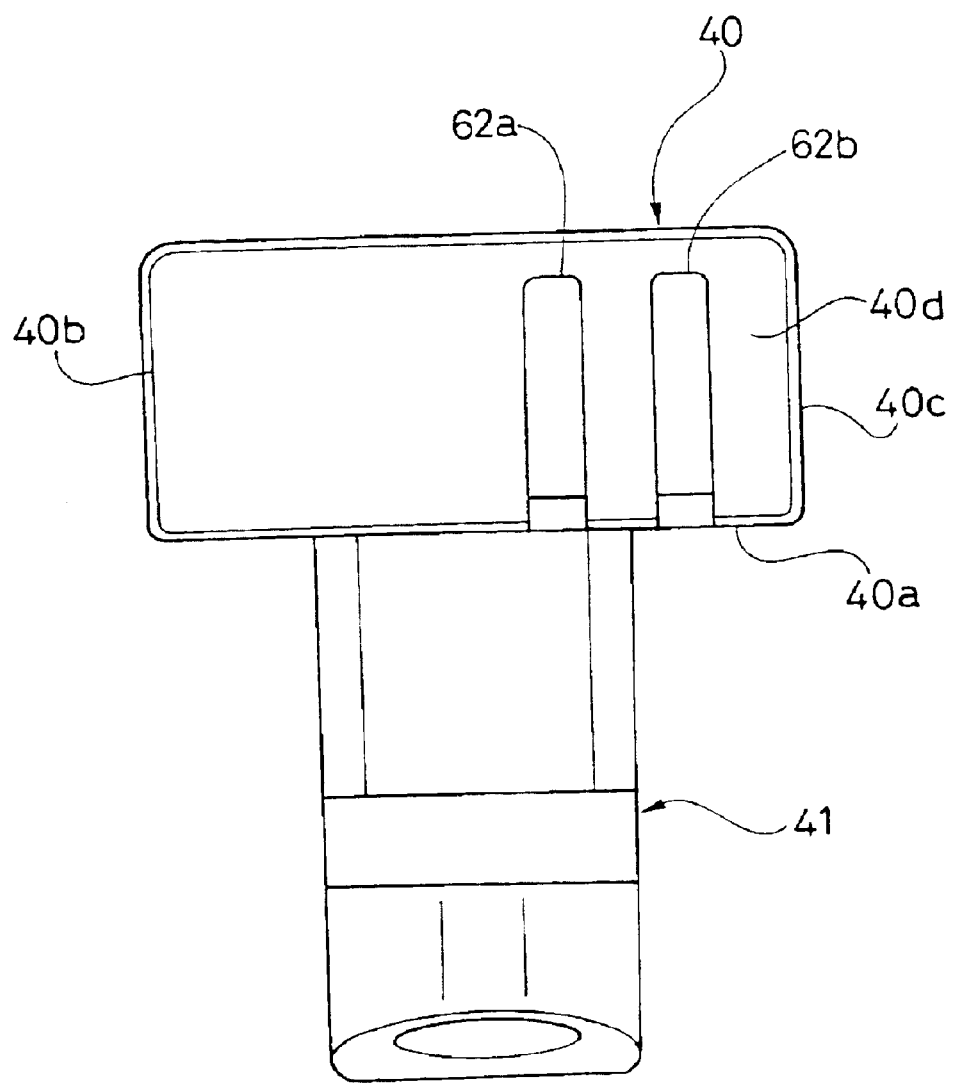
FIG. 13 is a front end elevational view of the base portion and the mounting portion illustrated in FIGS. 8–12, with the fastener removed.
Figure 14:
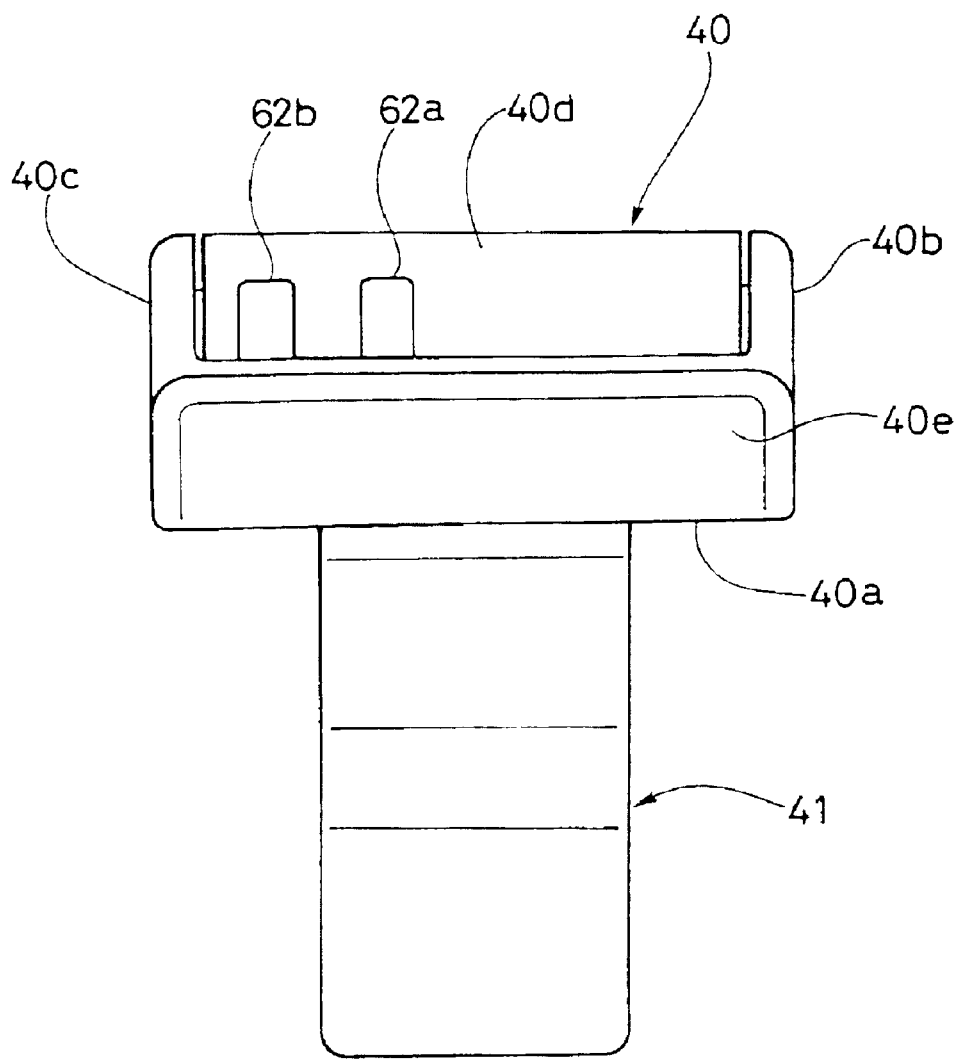
FIG. 14 is a rear end elevational view of the base portion and the mounting portion illustrated in FIGS. 8–13, with the fastener removed.
Figure 15:
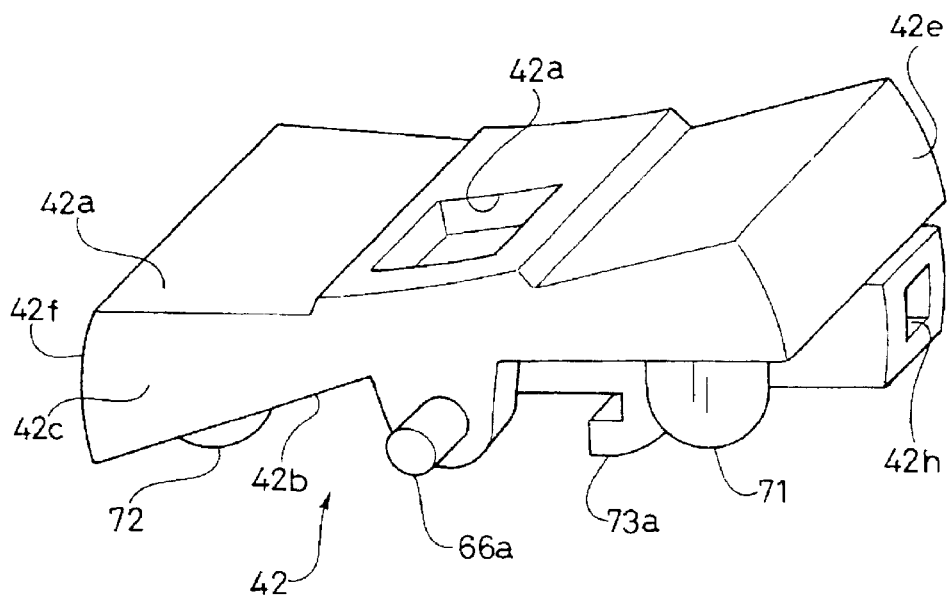
FIG. 15 is an enlarged perspective view of the toggle portion for the right or rear operating device in accordance with the embodiment of the present invention that is illustrated in FIGS. 3–7.
Figure 16:
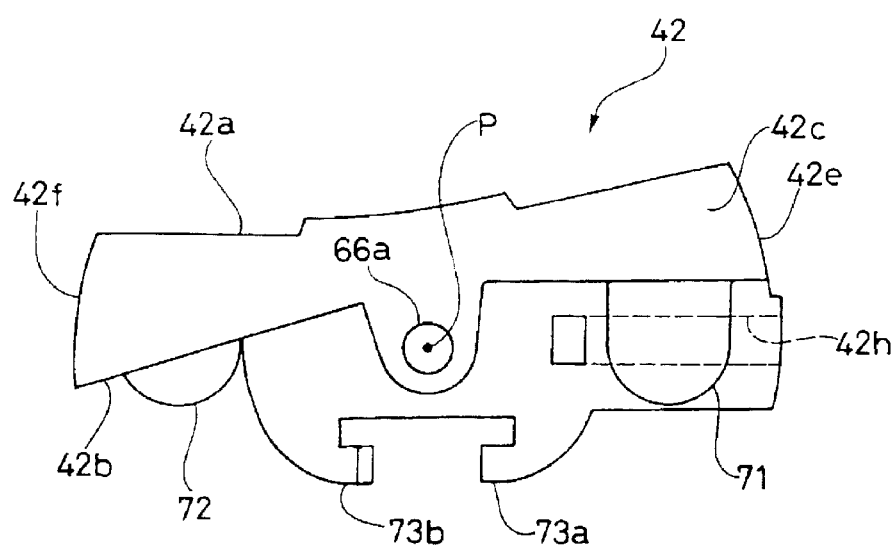
FIG. 16 is an enlarged right side elevational view of the toggle portion illustrated in FIG. 15.
Figure 17:
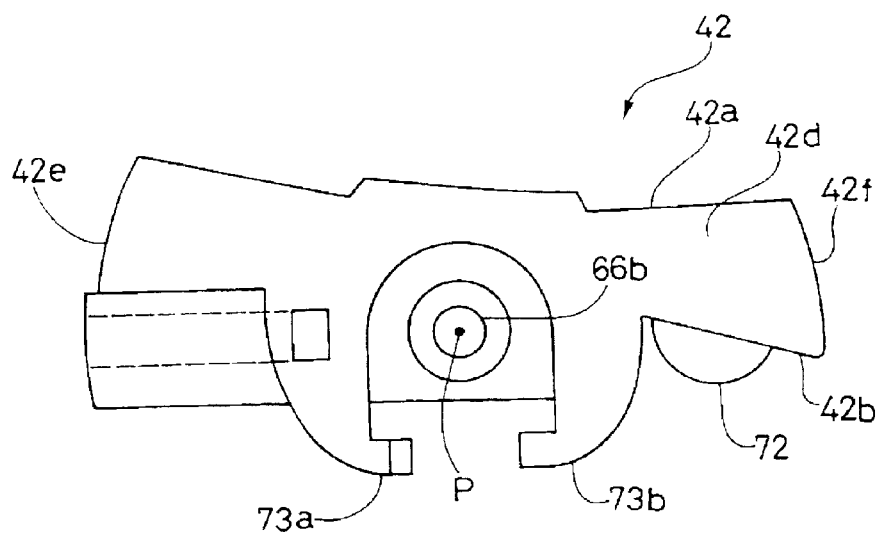
FIG. 17 is an enlarged left side elevational view of the toggle portion illustrated in FIGS. 15 and 16.
Figure 18:
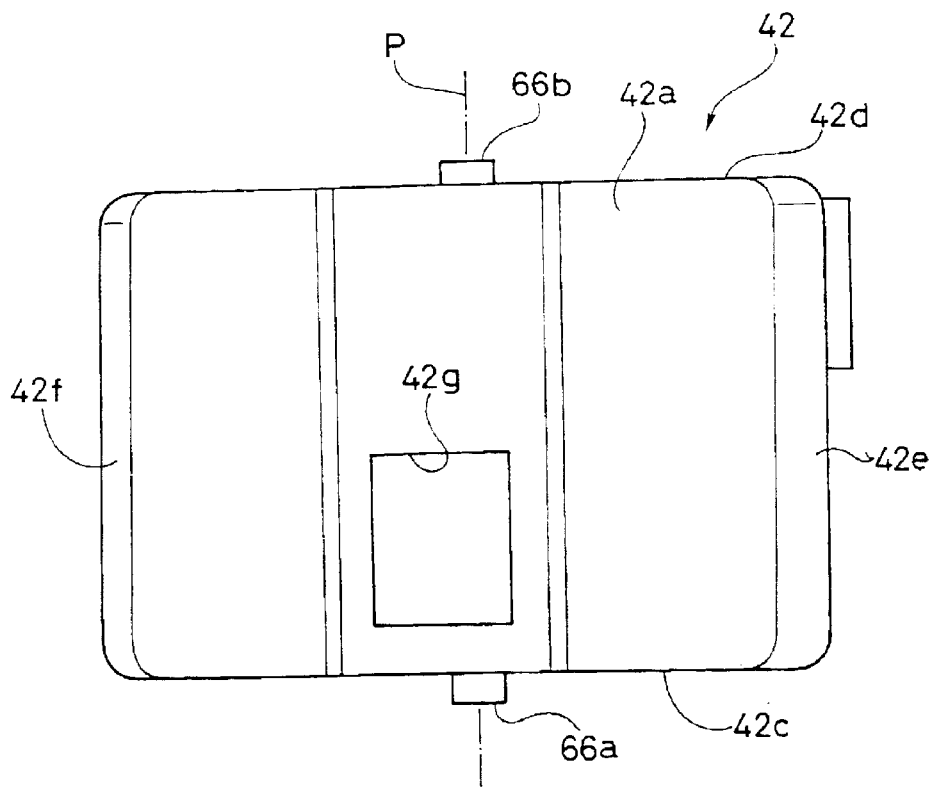
FIG. 18 is a top plan view of the toggle portion illustrated in FIGS. 15–17.
Figure 19:
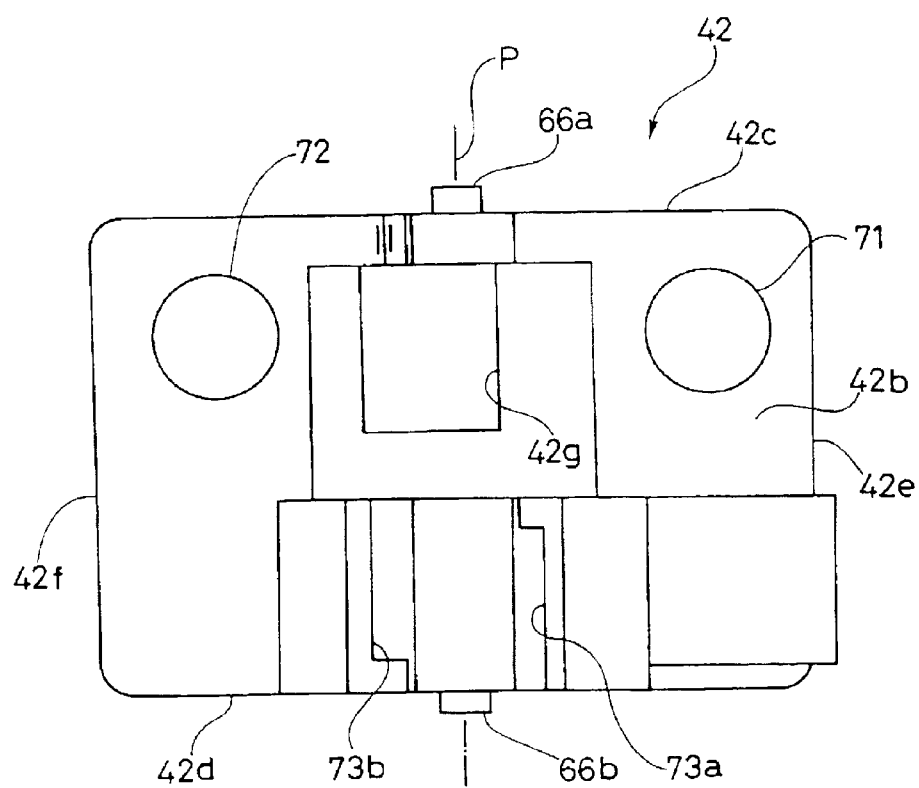
FIG. 19 is a bottom plan view of the toggle portion illustrated in FIGS. 15–18.
Figure 20:
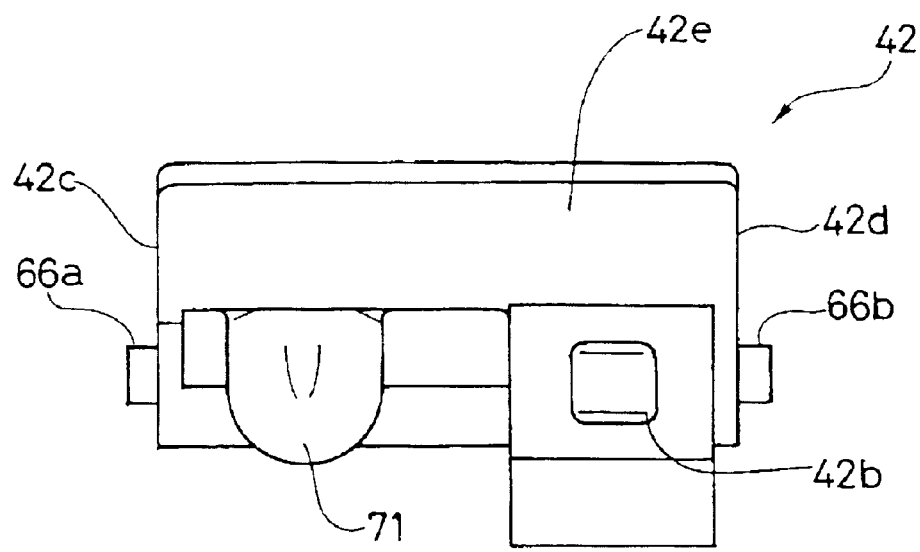
FIG. 20 is a front end elevational view of the toggle portion illustrated in FIGS. 15–19.
Figure 21:
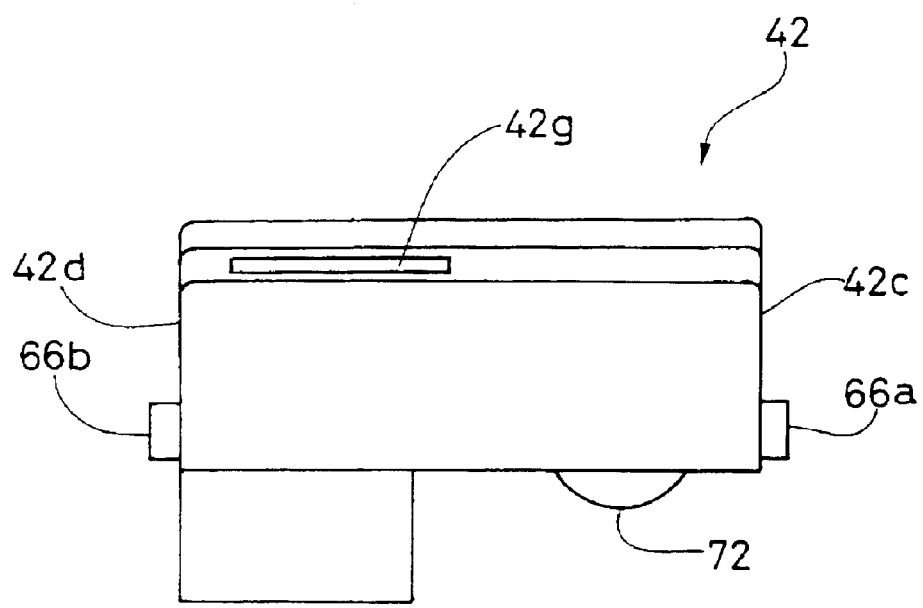
FIG. 21 is a rear end elevational view of the toggle portion illustrated in FIGS. 15–20.

Referring initially to FIGS. 1–3, a bicycle 10 is illustrated that is equipped with a first embodiment of the present invention, as discussed below. Basically, the bicycle 10 includes an electronically controlled drive train 12 mounted on a frame 14 having a handlebar 16 and a pair of wheels 18 coupled to the frame 12. The electronically controlled drive train 12 is controlled and operated by a cycle computer 20, a speed sensor 22, a rear shift operating device 24a and a front shift operating device 24b. Of course, the electronically controlled drive train 12 can be controlled and operated by other devices as needed and/or desired. For example, the pulse signals from a hub dynamo can be used as a speed sensor.

The drive train 12 basically includes a rear motorized derailleur 26a, a front motorized derailleur 26b, a chain 28, a front crankset 30 and a plurality of rear cassette sprockets 32. Of course, the shift operating devices 24a and 24b can be used with other types of the other types of drive trains. For example, an internal gear hub can be operated by one of the shift operating devices 24a and 24b.

The drive train 12 is operated by the shift operating devices 24a and 24b and/or the cycle computer 20 in a conventional manner, as discussed below in more detail. The bicycle 10 is also preferably provided with an electronically controlled rear suspension 36a and an electronically controlled front suspension 36b that are operated by the shift operating devices 24a and 24b as explained below. In particular, the right shift operating devices 24a upshifts and down shifts the rear derailleur 26a and changes the shifting point tables between a cruising mode, a driving mode, etc. The left shift operating devices 24b upshifts and down shifts the front derailleur 26b and changes the stiffnesses of the suspensions 36a and 36b between a hard suspension setting and a soft suspension setting.

The bicycle 10 and its various components are well known in the prior art, except for the improved portions of the shift operating devices 24a and 24b of the present invention. Thus, the bicycle 10 and its various components will not be discussed or illustrated in detail herein, except for the components that relate to the shift operating devices 24a and 24b of the present invention. In other words, the shift operating devices 24a and 24b can be used to operate/control any electronically controlled drive train and any electronically controlled rear suspension. It will also be apparent to those skilled in the art from this disclosure that the shift operating devices 24a and 24b can be used to operate/control other electronically controlled components in accordance with the present invention.

Moreover, it will be apparent to those skilled in the art from this disclosure that various conventional bicycle parts such as brakes, additional sprockets, etc., which are not illustrated and/or discussed in detail herein, can be used in conjunction with the present invention.

The various electrical devices (the cycle computer 20, the front wheel speed sensor 22, the shift operating devices 24a and 24b and the derailleurs 26a and 26b, etc.) of the bicycle 10 are electrically coupled together by electrical cords or wires in a relatively conventional manner. More specifically, the shift operating devices 24a and 24b are electrically coupled to the cycle computer 20 via the electrical cords 25a and 25b, respectively. The cycle computer 20 is in turn electrically connected by electrical cords or wires to the speed sensor 22, the motorized derailleurs 26a and 26b, the electronically controlled suspensions 36a and 36b and other sensors (not shown) if needed and/or desired.

Motorized derailleurs are known in the art. Thus, the motorized derailleurs 26a and 26b (i.e. rear and front derailleurs, respectively) will not be discussed or illustrated in detail herein.

The cycle computer 20 preferably includes a microcomputer formed on a printed circuit board that is powered by a battery unit or dynamo. The microcomputer of the cycle computer 20 includes a central processing unit (CPU), a random access memory component (RAM), a read only memory component (ROM), and an I/O interface. The various components of the microcomputer are well known in the bicycle field. Therefore, the components used in the microcomputer of the cycle computer 20 will not be discussed or illustrated in detail herein. Moreover, it will be apparent to those skilled in the art from this disclosure that the cycle computer 20 can include various electronic components, circuitry and mechanical components to carryout the present invention. Of course, it will be apparent to those skilled in the art from this disclosure that the cycle computer 20 can have a variety of configurations, as needed and/or desired. For example, the cycle computer 20 can be divided into a display unit and a control unit with the control unit mounted at a different location on the bicycle frame from the display unit. In the illustrated embodiment, the cycle computer 20 functions as a display unit, a shift control unit and a suspension control unit.

Preferably, the cycle computer 20 has a display that displays various information to the rider. The cycle computer 20 operates the derailleurs 26a and 26b and the electronically controlled suspensions 36a and 36b based on input from the rider via the shift operating devices 24a and 24b and/or input from the speed sensor 22. Thus, the shift operating devices 24a and 24b are operatively coupled to the derailleurs 26a and 26b and the front and rear suspensions 36a and 36b.

The parts of the right and left shift operating devices 24a and 24b are substantially identical to each other, except that they are mirror images of each other. The right or rear shift operating device 24a is basically an electrical switch device that controls the rear derailleur or shift device 26a as well as the shifting point tables. The left or front shift operating device 24b is basically an electrical switch device that controls the front derailleur or shifting device 26b as well as the stiffnesses of the electronically controlled suspensions 36a and 36b.

Since the shift operating devices 24a and 24b are substantially identical to each other in their constructions, only the shift operating device 24a will be discussed and/or illustrated in detail herein. Of course, it will be apparent to those skilled in the art from this disclosure that the descriptions of the parts of the shift operating device 24a applies to the construction of the shift operating device 24b.

As seen in FIGS. 3–7, the shift operating device 24a basically includes a base portion 40 with a mounting portion 41, a toggle portion 42, a button portion 43 and three electrical contact switches 44, 45 and 46. A clicking mechanism 47 is also provided in the shift operating device 24a to indicate to the rider that the toggle portion 42 has been sufficiently moved in order to selectively operate the first and second switches 44 and 45. The clicking mechanism 47 is positioned in a manner to provide for a compact arrangement of the shift operating device 24a. The shift operating device 24a is adapted to be secured on the handlebar 16 of the bicycle 10 by the mounting portion 41.

The toggle portion 42 is pivotally mounted on the base portion 40 for selectively contacting the electrical contact switches 44 and 45 that are operatively connected to the rear derailleur or shift device 26a via the cycle computer 20 to upshift or downshift the rear derailleur or shift device 26a. In particular, the toggle portion 42 is pivotally mounted to the base portion 40 about a pivot axis P and biased by a preloaded biasing element 48 to a toggle neutral position where the toggle portion 42 is spaced from the first and second electrical contact switches 44 and 45. Preferably, the biasing element 48 is a torsion spring that holds the toggle portion 42 in a neutral position relative to the first and second contact switches 44 and 45. The biasing element 48 has its coiled part 48a concentrically arranged about the pivot axis P and its free ends 48b and 48c contacting both the base portion 40 and the toggle portion 42 to urge the toggle portion 42 to the toggle neutral position. Movement of the toggle portion 42 relative to the base portion 40 about the pivot axis P causes the free ends 48b and 48c of the biasing element 48 to be compressed together. When the toggle portion 42 is moved relative to the base portion 40 about the pivot axis P in a first rotational direction $R_1$, the toggle portion 42 moves from the toggle neutral position where the toggle portion 42 is spaced from the first and second electrical contact switches 44 and 45 to a first contact position where the toggle portion 42 contacts or depresses the first electrical contact switch 44. When the toggle portion 42 is moved relative to the base portion 40 about the pivot axis P in a second opposite rotational direction $R_2$, the toggle portion 42 moves from the toggle neutral position where the toggle portion 42 is spaced from the first and second electrical contact switches 44 and 45 to a second contact position where the toggle portion 42 contacts acts or depresses the second electrical contact switch 45.

The button portion 43 is movably coupled to the toggle portion 42 between a button neutral position where the button portion 43 is spaced from the third electrical contact switch 46 and a third contact position where the button portion 43 contacts the third electrical contact switch 46. The button portion 43 in movably mounted in the toggle portion 42 for linear movement in a direction L that is substantially perpendicular to the pivot axis P. Preferably, the linear movement of the button portion 43 lies on a line that intersects the pivot axis P of the toggle portion 42. In other words, in the illustrated embodiment, the button portion 43 is located in the center or middle section of the toggle portion 42 along the pivot axis P. When the button portion 43 is moved relative to the toggle portion 42 along the direction L, the button portion 43 contacts or depresses the electrical contact switch 46 that is operatively connected to the electronically controlled shift devices 26a and 26b via the cycle computer 20. As mentioned above, the button portion of the left shift operating device 24b is operatively connected to the electronically controlled suspensions 36a and 36b, while the button portion 43 of the right shift operating device 24a is operatively connected to the electronically controlled derailleurs 26a and 26b to change the shifting point tables.

As seen in FIGS. 8–14, the base portion 40 is preferably constructed as a one-piece, unitary member from a lightweight rigid material such as a hard molded plastic material. Of course, the base portion 40 can be constructed of several pieces that are coupled together. The base portion 40 basically has a bottom wall 40a, a pair of opposed side walls 40b and 40c and a pair of end walls 40d and 40e. The bottom wall 40a is fixedly connected to the mounting portion 41. The walls 40b–40e extend upwardly in a substantially perpendicular arrangement from the bottom wall 40a to form a toggle receiving recess 50 for receiving the toggle portion 42 therein. Of course, the recess 50 does not have to be an enclosed recess that completely surrounds the toggle portion 42. In other words, the side walls 40b and 40c can be replaced with mounting flanges and/or the bottom wall 40a can be completely removed.

The bottom wall 40a has a spring receiving opening 54 that receives the free ends 48b and 48c of the biasing element 48. The opening 54 is sized to compress the free ends 48b and 48c of the biasing element 48 together so the biasing element 48 is preloaded.

The side walls 40b and 40c have pivot openings 56a and 56b for pivotally supporting the toggle portion 42 within the recess 50 of the base portion 40. The pivot openings 56a and 56b are aligned with their centers forming the pivot axis P.

The side wall 40b has two slots 58a and 58b that receive a portion of a contact switch supporting member 52 to retain the contact switch supporting member 52 in the base portion 40. In particular, the contact switch supporting member 52 has the electrical contact switches 44, 45 and 46 mounted thereon. When the contact switch supporting member 52 is inserted through the slots 58a and 58b of the side wall 40b, the electrical contact switches 44, 45 and 46 are located in the recess 50 of the base portion 40 and in between the bottom wall 40a of the base portion 40 and the toggle portion 42. Of course, the electrical contact switches 44, 45 and 46 can be mounted in other ways in between the bottom wall 40a of the base portion 40 and the toggle portion 42 as needed and/or desired. Moreover, while the electrical contact switches 44, 45 and 46 are illustrated as conventional pressure activated electrical contact switches, it will be apparent from this disclosure that other types of pressure activated switches can be used.

The opposed side walls 40b and 40c also have a pair of notches 60a and 60b formed adjacent the end wall 40d. The end wall 40d has a pair of cutouts 62a and 62b that extend into the bottom wall 40a. These notches 60a and 60b and cutouts 62a and 62b retain a part of the clicking mechanism 47 against the end wall 40d, as explained below.

As seen in FIGS. 8–14, the mounting portion 41 is preferably constructed as a one-piece, unitary member from a lightweight rigid material such as a hard molded plastic material. In the preferred embodiment, the mounting portion 41 is a split tubular clamping member that receives a fastener 64 (bolt 64a and nut 64b) to secure the shift operating device 24a to the handlebar 16 in a conventional manner. The mounting portion 41 can be attached to the base portion 40 in a variety of ways. For example, the base portion 40 and the mounting portion 41 can be welded together via heat or adhesive. Alternatively, a fastener such as a screw can be utilized to secure the mounting portion 41 to the base portion 40 in a fixed manner.

As seen in FIGS. 15–21, the toggle portion 42 in this embodiment is preferably constructed as a one-piece, unitary member from a lightweight rigid material such as a hard molded plastic material. The toggle portion 42 has an upper operating surface 42a and a lower switch contacting surface 42b with a pair of opposed side surfaces 42c and 42d and a pair of opposed end surfaces 42e and 42f extending therebetween. The operating surface 42a of the toggle portion 42 is exposed so that the rider can pivot the toggle portion 42 about the pivot axis P between the toggle neutral position and the first and second contact positions. A button receiving bore 42g extends through the toggle portion 42 between the operating surface 42a and the switch contacting surface 42b for movably receiving the button portion 43 therein. The end surfaces 42e has a spring receiving bore 42h that acts as a housing part of the clicker mechanism 47 as explained below.

As previously mentioned, the toggle portion 42 is pivotally coupled to the base portion 40 for selectively contacting the first and second electrical contact switches 44 and 45. The biasing element 48 holds the toggle portion 42 in a toggle neutral position relative to the first and second contact switches 44 and 45. In this embodiment, the first switch 44 controls upshifting of the rear derailleur 26a, while the second switch 45 controls the downshifting of the rear derailleur 26a.

The toggle portion 42 has a pair of pivot members or pins 66a and 66b integrally formed therewith. The pivot members or pins 66a and 66b protrude outwardly in a sideward direction from the side surfaces 42c and 42d. The center axes of the pivot pins 66a and 66b form the pivot axis P and are received in the pivot openings 56a and 56b of the base portion 40. The pivot pin 66a is longer than the pivot pin 66b and has the biasing element 48 mounted thereon. Specifically, the coil part 48a of the biasing element 48 is mounted on the pivot pin 66a.

The switch contacting surface 42b of the toggle portion 42 is provided with a pair of protrusions 71 and 72 for contacting/depressing the first and second contact switches 44 and 45 upon pivotal movement of the toggle portion 42. The protrusions 71 and 72 are located at opposite ends of the toggle portion 42.

Two spring abutments 73a and 73b are formed adjacent opposite longitudinal sides of the pivot pin 66b. The spring abutments 73a and 73b are arranged and configured to contact the free ends 48b and 48c of the biasing element 48 together so the biasing element 48 is preloaded. The free ends 48b and 48c of the biasing element 48 are also received in the spring receiving opening 54 in the bottom wall 40a of the base portion 40. The free ends 48b and 48c of the biasing element 48 engage the spring receiving opening 54 such that the toggle portion 42 is normally held against pivotal movement relative to the base portion 40. In other words, the free ends 48b and 48c of the biasing element 48 engage the spring receiving opening 54 of the base portion 40 to urge the toggle portion 42 to a neutral position. However, when a rider presses down on one of the longitudinal ends of the toggle portion 42, the toggle portion 42 pivots against the urging force of the biasing element 48. Thus, the toggle portion 42 pivots to one of the first and second contact positions for contacting or depressing the first and second contact switches 44 and 45. More specifically, by pushing down on one of the longitudinal ends of the toggle portion 42, one of the free ends 48b and 48c of the biasing element 48 is moved from contacting the base portion 40 so as to allow pivotal movement of the toggle portion 42 relative to the base portion 40.

Figure 22:
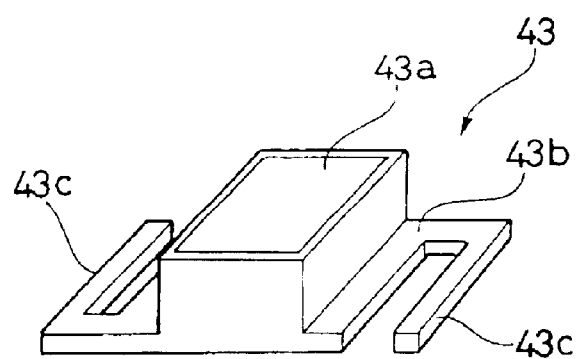
FIG. 22 is an enlarged perspective view of the button portion for the right or rear operating device in accordance with the embodiment of the present invention that is illustrated in FIGS. 3–7.
Figure 23:
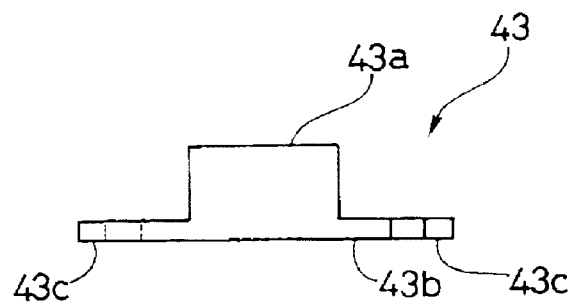
FIG. 23 is an enlarged right side elevational view of the button portion illustrated in FIG. 22.
Figure 24:
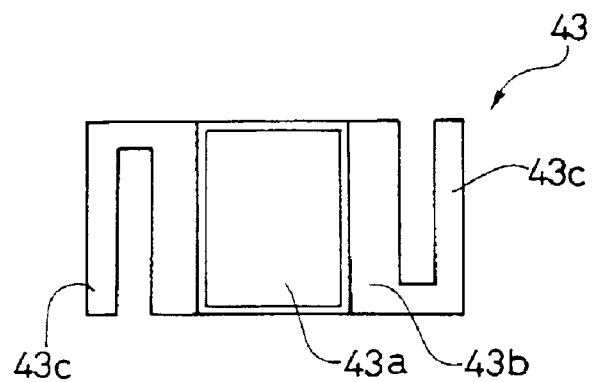
FIG. 24 is a top plan view of the button portion illustrated in FIGS. 22 and 23.

As seen in FIGS. 22–24, in this embodiment the button portion 43 is preferably constructed as a one-piece, unitary member from a lightweight rigid material such as a hard molded plastic material. The button portion 43 is movably mounted in the button receiving bore 42g of the toggle portion 42. The button portion 43 extends outwardly from the operating surface 42a of the toggle portion 42 so that the rider can push or linearly move the button portion 43 in the button receiving bore 42g of the toggle portion 42 to operate the suspension. In particular, the button portion 43 contacts or depresses the third electrical switch 46 to control the mode or setting of the suspension. In other words, by pushing the button portion 43, the third switch 46 is toggled between a cruising mode and a driving mode. Similarly, the button portion of the left operating device 24b is toggled between a hard suspension setting and a soft suspension setting.

Preferably, the button portion 43 has a depressing part 43a and a biasing part 43b integrally formed with the depressing part 43a as a one-piece, unitary member. The biasing part 43b basically has a pair of spring arms 43c that have the free ends fixed to the switch contacting surface 42b of the toggle portion 42 by adhesively or heat welded or some other means. When the depressing part 43a is pushed downwardly towards the bottom wall 40a of the base portion 40, the arm parts 43c apply an urging force to the depressing part 43a to bias the depressing part 43a back to the neutral position. In other words, when the rider presses on the depressing part 43a of the button portion 43, the depressing part 43a moves downwardly and depresses the third electrical switch 46 to operate the rear suspension 36a of the bicycle 10. When the rider releases the depressing part 43a of the button portion 43, the arm parts 43c return the button portion 43 back to the neutral position.

Figure 25:
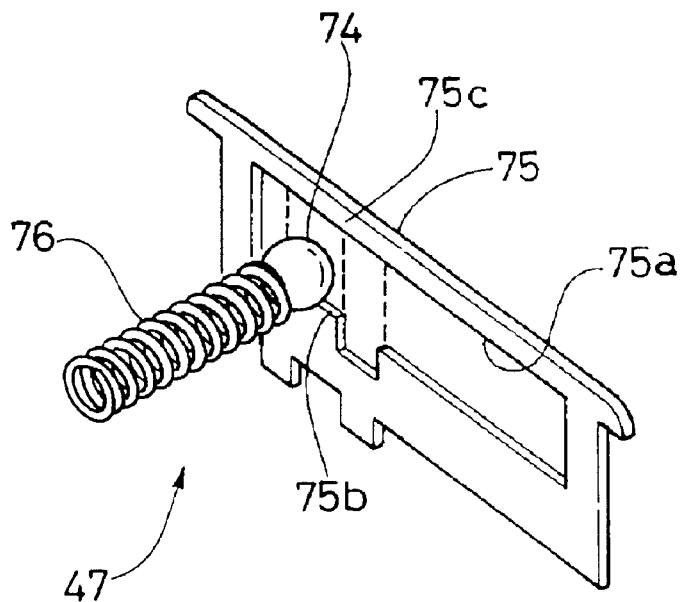
FIG. 25 is a partial side perspective view of the clicking for the right or rear operating device in accordance with the embodiment of the present invention that is illustrated in FIGS. 3–7.
Figure 26:
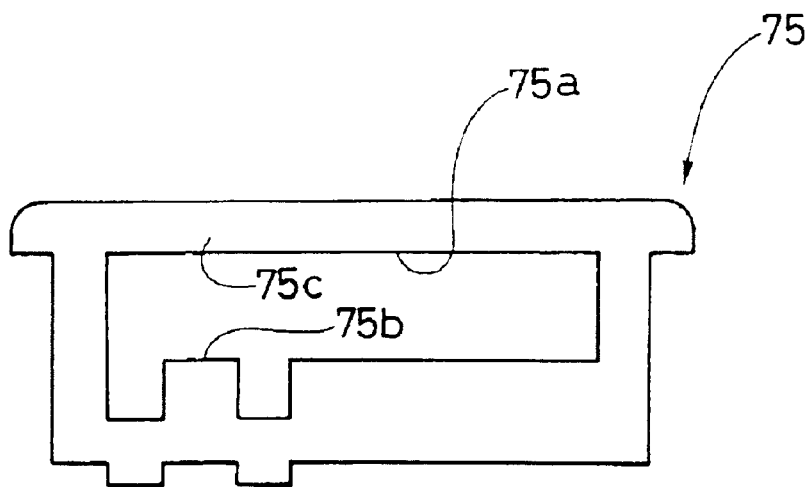
FIG. 26 is an enlarged rear elevational view of clicking member or plate for the right or rear operating device in accordance with the embodiment of the present invention that is illustrated in FIGS. 3–7.

As seen in FIGS. 3, 25 and 26, the clicking mechanism 47 is operatively arranged between the base portion 40 and the toggle portion 42 at one of the longitudinal ends 42e of the toggle portion 42. This arrangement allows for a very compact shift operating device 24a. Preferably, the clicking mechanism 47 includes a detent member 74, a clicking member or plate 75 and a biasing member 76 operatively urging the detent member 74 into engagement with the clicking member 75.

The clicking member 75 is operatively coupled between one of the upstanding end walls 40d of the base portion 40 and the toggle portion 42 to indicate when the toggle portion 42 has been moved from the toggle neutral position to either the first or second contact positions. In other words, the detent member 74 provides a clicking feeling to the rider's finger when the detent member 74 engages the clicking member or plate 75. Thus, the rider can know that a shift operation has occurred. In the preferred embodiment, the detent member 74 is a spherical member or ball and the biasing member 76 is a compression spring that urges the detent member 74 into engagement with the clicking member or plate 75. The clicking member or plate 75 has an opening 75a that receives the detent member 74 when the toggle portion 42 is in the toggle neutral position. The opening and the wall 40d form a detent receiving recess. When the toggle portion 42 is pivoted to either the first or second contact position, the detent member 74 contacts either a first indicating surface 75b or a second indicating surface 75c that are located on opposite sides of the opening 75a. Accordingly, the opening 75a forms a rest position for the detent member 74. Of course, it will be apparent to those skilled in the art from this disclosure that other types of arrangements can be utilized that do not depart from the present invention.

Preferably, the cycle computer or control unit 20 has a display that provides or displays various information to the rider including, but not limited to, gear positions of the derailleur 26a and 26 and setting of the suspensions 36a and 36b. The cycle computer or control unit 20 operates and controls the derailleur 26a and 26b and the suspensions 36a and 36b. Thus, the drive train 12 of the bicycle 10 is operated or electronically controlled by the cycle computer 20. Preferably, the cycle computer 20 electrically operates the motorized derailleur 26a and 26b so that they can be either automatically or manually operated. One example of an automatic shifting assembly that can be adapted to be used with the present invention is disclosed in U.S. Pat. No. 6,073,061 to Kimura, which is assigned to Shimano Inc.

In the manual mode, shifting of each of the motorized derailleurs 26a and 26b is preformed by via manually moving the toggle portion 42 of one the shift operating devices 24a and 24b. Pivoting one of the toggle portions 42 depresses one of the switches 44 or 45 that generate a predetermined operational command that is received by the central processing unit of the cycle computer 20. The central processing unit of the cycle computer 20 then sends a predetermined operational command or electrical signal to move or shift one of the motorized derailleur assemblies 26a and 26b.

In the automatic mode, shifting of each of the motorized derailleurs 26a and 26b is preferably at least partially based on the speed of the bicycle and the torque applied to the pedals. Thus, the cycle computer 20 further includes at least one speed sensing/measuring device or component and at least one torque sensing/measuring device or component. The speed sensing/measuring device or component provides information indicative of the speed of the bicycle 10 to the central processing unit of the cycle computer 20. The torque sensing/measuring device or component provides information indicative of the torque applied to the pedals to the central processing unit of the cycle computer 20. The sensing/measuring components generate predetermined operational commands indicative of the speed of the bicycle 10 and the torque applied to the pedals, respectively. Of course, additional sensing/measuring components can be operatively coupled to central processing unit of the cycle computer 20 such that predetermined operational commands are received by the central processing unit (CPU) of the cycle computer 20 to automatically operate the motorized derailleurs 26a and 26b or other components.

The sensing/measuring component can be, for example, a speed sensing unit that includes the speed sensor 22 and a magnet 45. The speed sensor 22 is preferably a magnetically operable sensor that is mounted on the front fork of the bicycle 10 and senses the magnet 45 that is attached to one of the spokes of the front wheel of the bicycle 10. The speed sensor 22 can be a reed switch or other component for detecting the magnet 45. The speed sensor 22 generates a pulse each time wheel of the bicycle 10 has turned a pre-described angle or rotation. In other words, the speed sensor 22 detects the rotational velocity of the front wheel of the bicycle 10. As soon as speed sensor 22 generates the pulse or signal, a pulse signal transmission circuit sends this pulse signal to the central processing unit of the cycle computer 20. The cycle computer 20 determines whether the chain 24 should be upshifted or downshifted, based on this speed information and any other relevant information that it has available. Thus, the speed sensor 22 and the magnet 45 form a sensing device or measuring component of the cycle computer 20. In other words, the speed sensor 22 outputs a bicycle speed signal by detecting the magnet 45 mounted on the front wheel of the bicycle 10. Thus, speed information is sent to the battery operated electronic cycle computer 20 to operate the motorized derailleur assemblies 26a and 26b, as needed and/or desired.

Alternatively, the sensing/measuring component can include other types of sensors. For example, a torque sensing unit that includes a torque sensor and a magnet can be used alone or in conjunction with the speed sensor 22. The torque sensor is preferably a magnetically operable sensor that is mounted on a stationary part of the bicycle 10. The torque sensor senses the magnet that is attached to the crank arm of the bicycle 10. The torque sensor can be a reed switch or other component for detecting the magnet. The torque sensor generates a pulse each time the crank arm of the bicycle 10 has turned a pre-described angle or rotation. In other words, the torque sensor detects the rotational torque of the crank arm of the bicycle 10. As soon as the torque sensor generates the pulse or signal, a pulse signal transmission circuit sends this pulse signal to the central processing unit of the cycle computer 20. The cycle computer 20 determines whether the chain should be upshifted or downshifted, based on this speed information and any other relevant information that it has available. Thus, the torque sensor and the magnet form a sensing device or measuring component of the cycle computer 20. In other words, the torque sensor outputs a bicycle torque signal by detecting a magnet mounted on the crank arm of the bicycle 10. Thus, torque information is sent to the battery operated electronic cycle computer 20 to operate the motorized derailleurs 26a and 26b, as needed and/or desired.

Second Embodiment

Referring now to FIGS. 27–35, a shift operating device 24a' is illustrated in accordance with a second embodiment. Basically, the shift operating device 24a' is identical to the shift operating device 24a', except that the button portion 43 and the third electrical switch 46 have been eliminated from the shift operating device 24a'. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity. The parts of the second embodiment that differ from the parts of the first embodiment will be indicated with a prime (').

Figure 27:
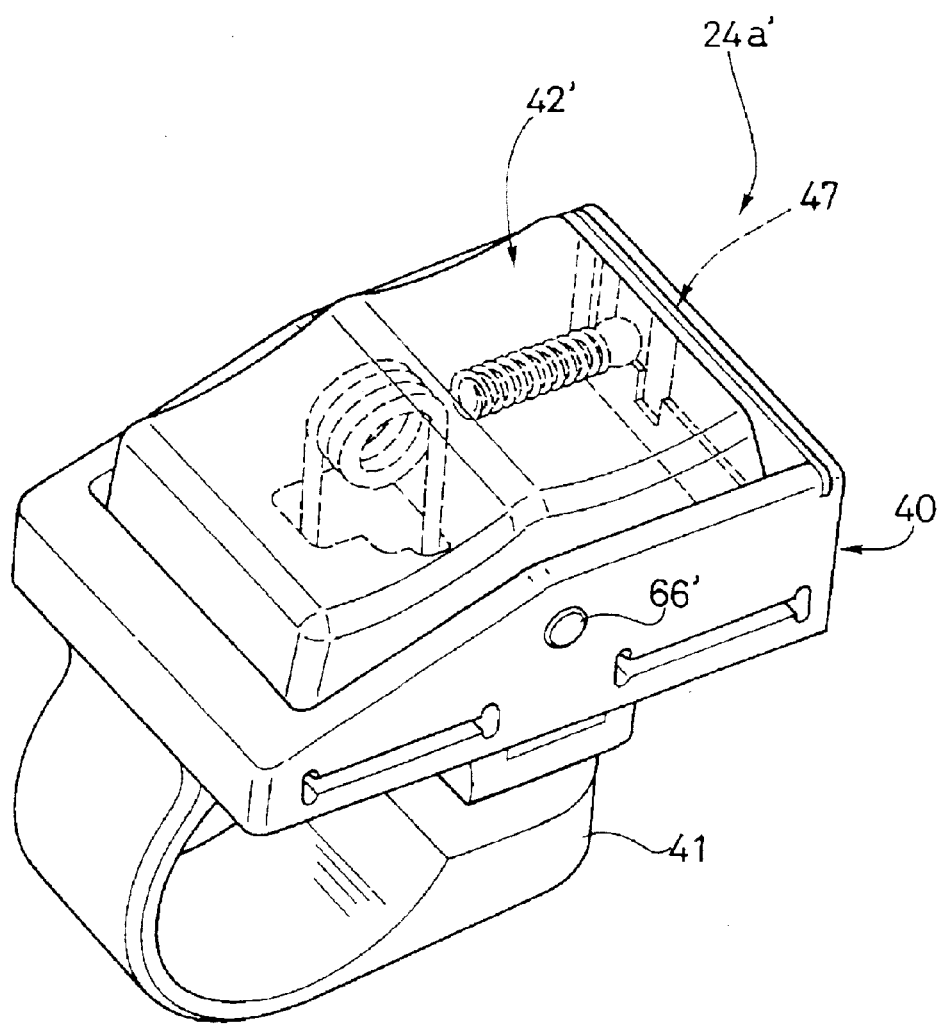
FIG. 27 is an enlarged perspective view of the right or rear operating device in accordance with a second embodiment of the present invention.
Figure 28:
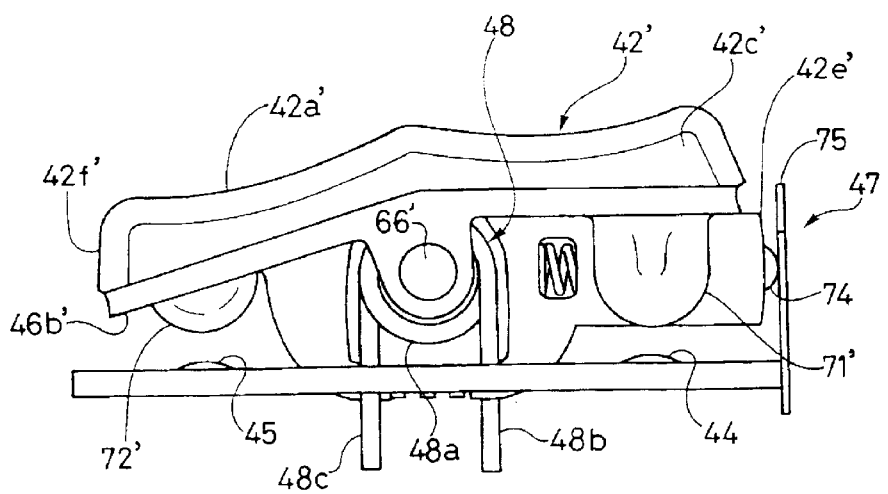
FIG. 28 is an enlarged diagrammatic side elevational view of the right or rear operating device illustrated in FIG. 27, when in the normal rest position (toggle neutral position)
Figure 29:
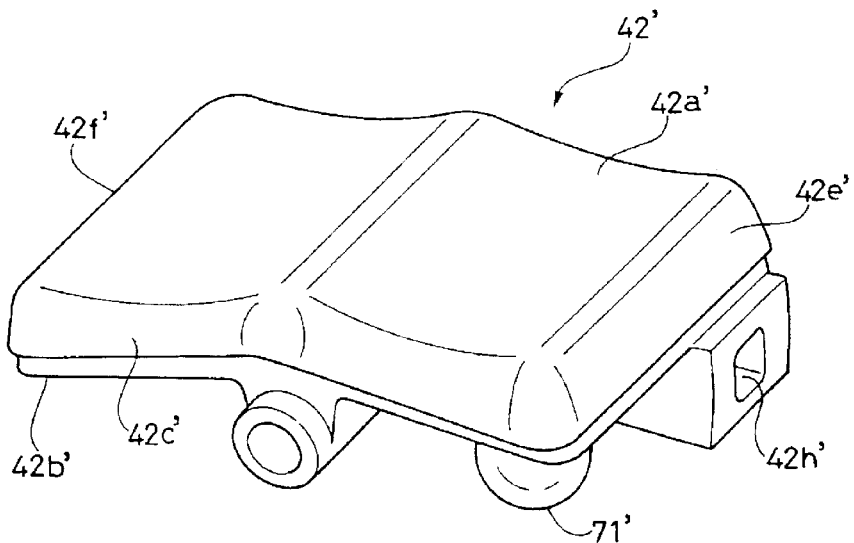
FIG. 29 is an enlarged perspective view of the toggle portion for the right or rear operating device illustrated in FIGS. 27 and 28.
Figure 30:
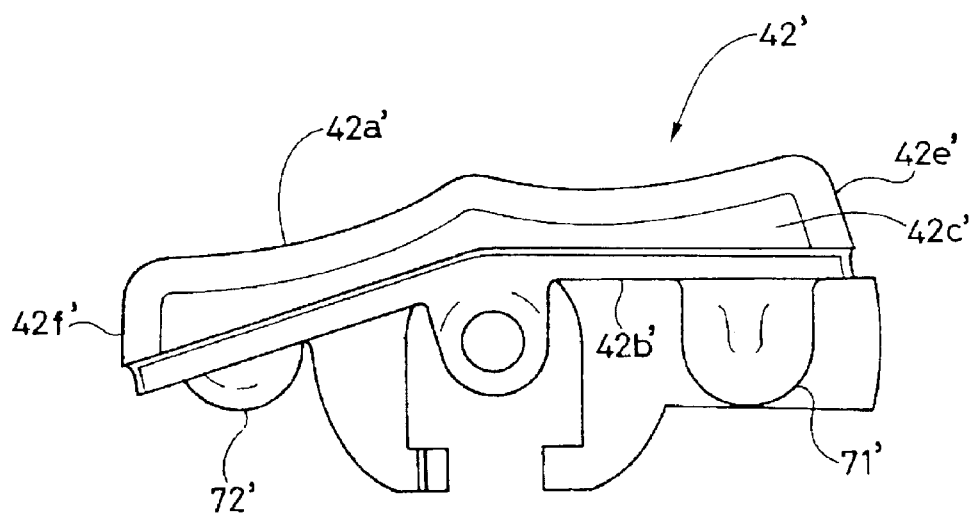
FIG. 30 is an enlarged right side elevational view of the toggle portion illustrated in FIG. 29.
Figure 31:
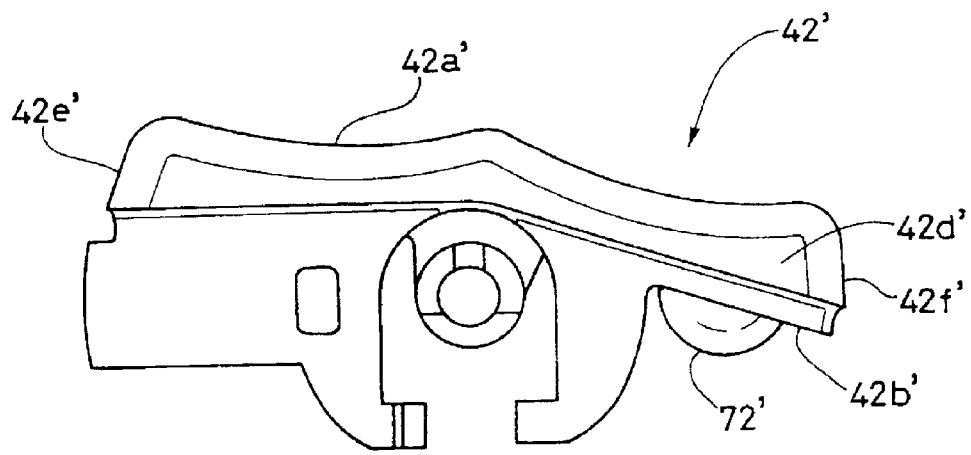
FIG. 31 is an enlarged left side elevational view of the toggle portion illustrated in FIGS. 29 and 30.
Figure 32:
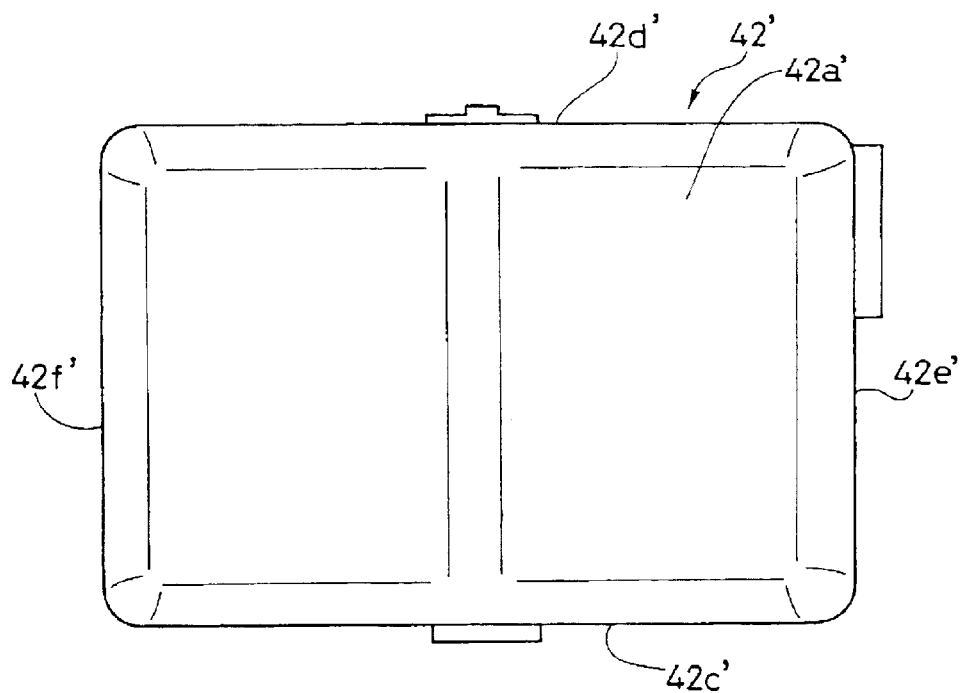
FIG. 32 is a top plan view of the toggle portion illustrated in FIGS. 29–31.
Figure 33:
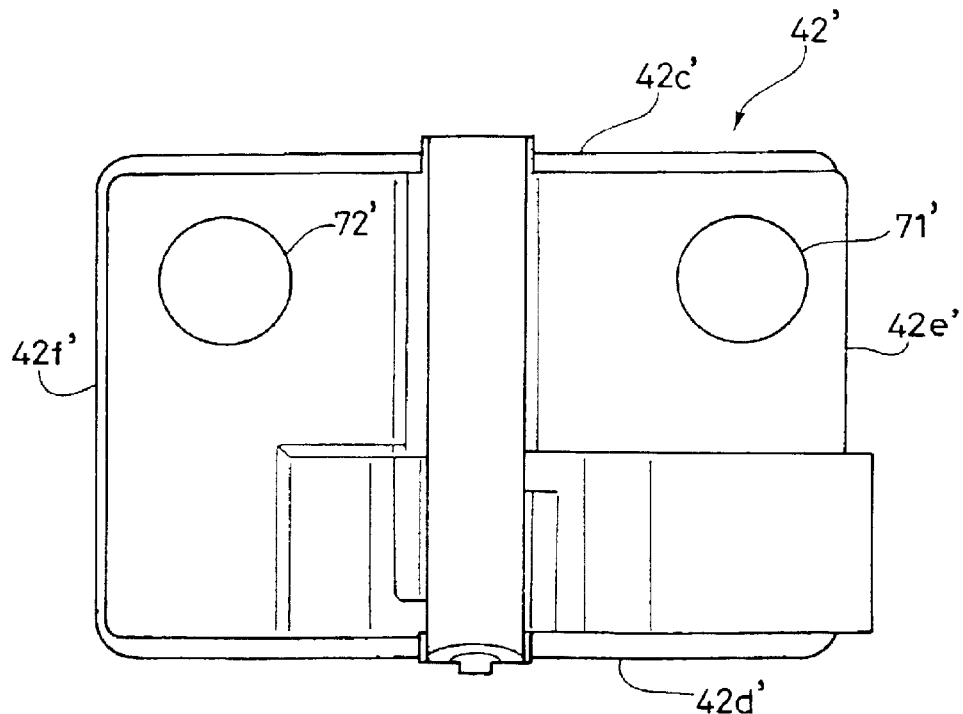
FIG. 33 is a bottom plan view of the toggle portion illustrated in FIGS. 29–32.
Figure 34:
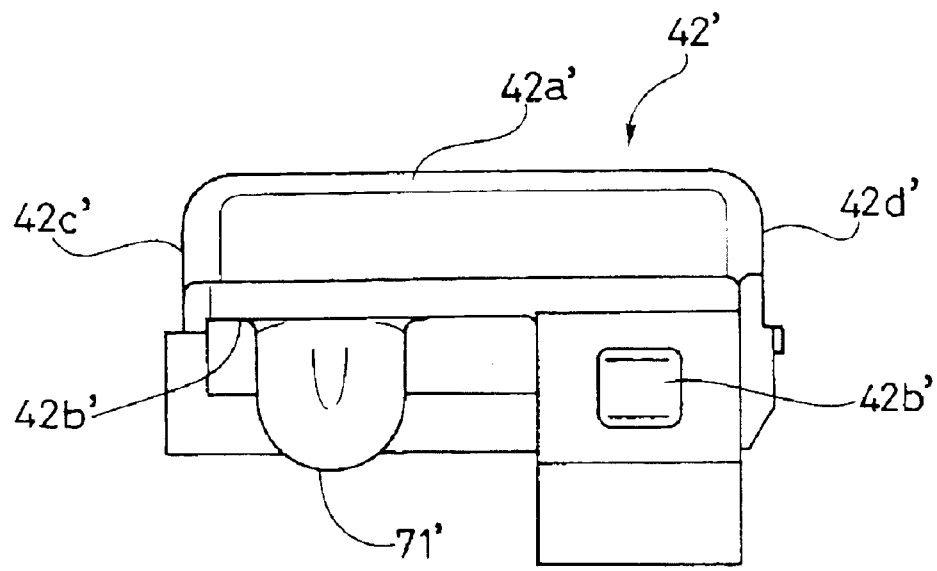
FIG. 34 is a front end elevational view of the toggle portion illustrated in FIGS. 29–33.
Figure 35:
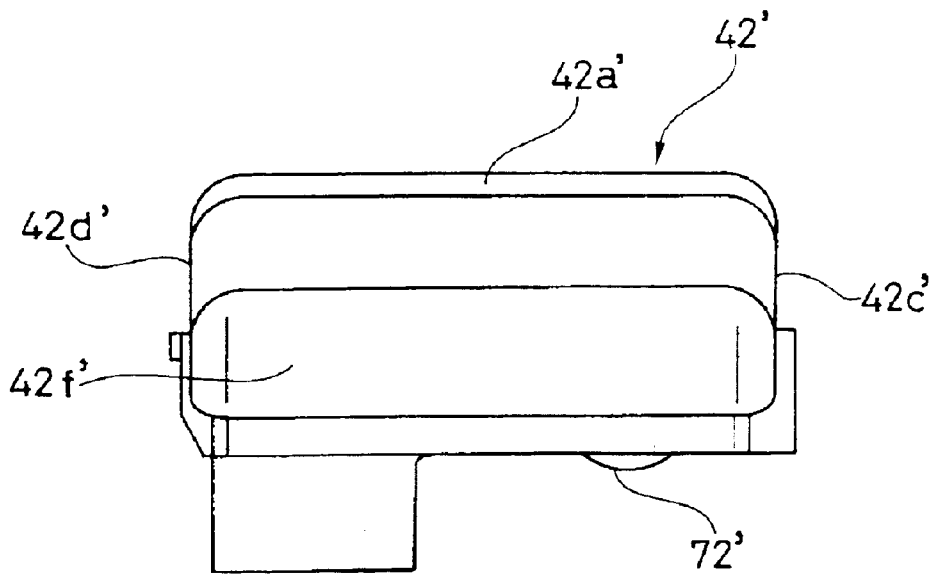
FIG. 35 is a rear end elevational view of the toggle portion illustrated in FIGS. 29–34.

As seen in FIG. 27, the shift operating device 24a' basically includes a base portion 40 with a mounting portion 41, a toggle portion 42', two electrical contact switches 44 and 45 and a clicking mechanism 47. Basically, only the toggle portion 42' has been modified in this embodiment in view of the elimination of the button portion 43 and the third electrical switch 46. In this embodiment, the toggle portion 42' is pivotally mounted to the base portion 40 by a single pivot pin 66'.

As seen in FIGS. 28–35, the toggle portion 42' in this embodiment is preferably constructed as a one-piece, unitary member from a lightweight rigid material such as a hard molded plastic material. The toggle portion 42' has an operating surface 42a' and a switch contacting surface 42b' with a pair of opposed side surfaces 42c' and 42d' and a pair of opposed end surfaces 42e' and 42f' extending therebetween. The operating surface 42a' of the toggle portion 42' is exposed so that the rider can pivot the toggle portion 42' about the pivot axis between the toggle neutral position and the first and second contact positions. The end surfaces 42e' has a spring receiving bore 42h' that acts as a housing part of the clicker mechanism 47 in the same manner as the first embodiment.

As previously mentioned, the toggle portion 42' is pivotally coupled to the base portion 40 and has protrusions 71' and 72' for selectively contacting the first and second electrical contact switches 44 and 45 in the same manner as the first embodiment. The biasing element 48 holds the toggle portion 42' in a toggle neutral position relative to the first and second contact switches 44 and 45. In this embodiment, the first switch 44 controls upshifting of the rear derailleur 26a, while the second switch 45 controls the downshifting of the rear derailleur 26a.

Modified Base Portion

Figure 36:
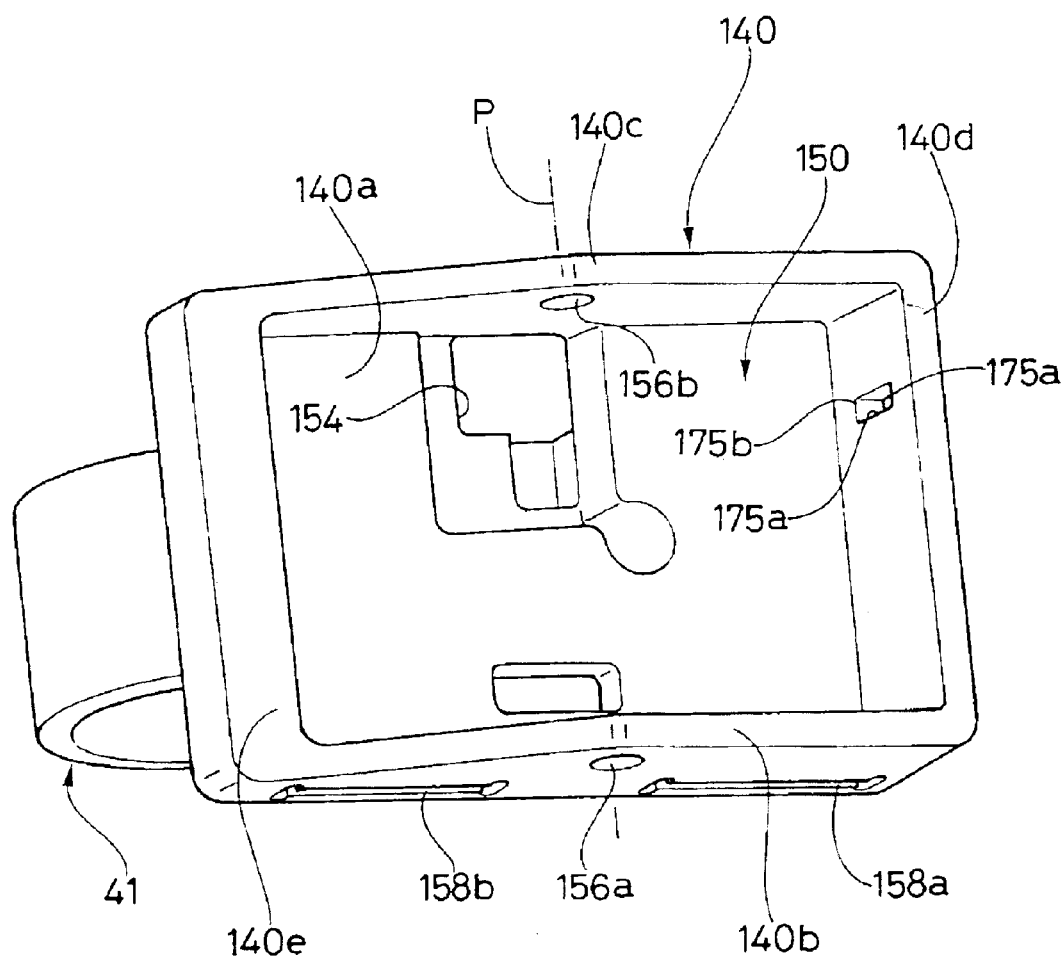
FIG. 36 is a perspective view of a modified base portion that can be substituted for the base portion illustrated in FIG. 8 so as to be used in the prior illustrated operating devices in accordance with the other embodiments of the present invention.

Referring now to FIG. 36, a modified base portion 140 is illustrated in accordance with another embodiment of the present invention. The modified base portion 140 eliminates the need for a separate clicking member or plate. In other words, when the base portion 40 of the shift operating devices 24a and 24a' is replaced with the modified base portion 140, the clicking member 75 is eliminated.

Similar to the base portion 40, the base portion 140 is preferably constructed as a one-piece, unitary member from a lightweight rigid material such as a hard molded plastic material. Of course, the base portion 140 can be constructed of several pieces that are coupled together. The base portion 140 basically has a bottom wall 140a, a pair of opposed side walls 140b and 140c and a pair of end walls 140d and 140e. The bottom wall 140a is fixedly connected to the mounting portion 41 in the same manner as in the prior embodiments. The walls 140b–140e extend upwardly in a substantially perpendicular arrangement from the bottom wall 140a to form a toggle receiving recess 150 for receiving the toggle portion 42 therein. Of course, the recess 150 does not have to be an enclosed recess that completely surrounds the toggle portion 42.

The bottom wall 140a has a spring receiving opening 154 that receives the free ends 48b and 48c of the biasing element 48. The opening 154 is sized to compress the free ends 48b and 48c of the biasing element 48 together so the biasing element 48 is preloaded in the same manner as in the prior embodiments.

The side walls 140b and 140c have pivot openings 156a and 156b for pivotally supporting the toggle portion 42 within the recess 150 of the base portion 140. The pivot openings 156a and 156b are aligned with their centers forming the pivot axis P.

The side wall 140b has two slots 158a and 158b that receive a portion of a contact switch supporting member 52 to retain the contact switch supporting member 52 in the base portion 140.

The end wall 140e forms the clicking member of the clicker mechanism 47 to indicate when the toggle portion 42 has been moved from the toggle neutral position to either the first or second contact positions. In particular, the end wall 140e has a narrow slot or slit 175a that receives the detent member 74 of the clicker mechanism 47, when the toggle portion 42 is in the toggle neutral position. The upper and lower edges 175b and 175c of the slit 175a form first and second indicating surfaces.

The detent member 74 provides a clicking feeling to the rider's finger when the detent member 74 engages one of the first and second indicating surfaces 175b and 175c of the slit 175a in the end wall 140e that forms the clicking member. Specifically, when the toggle portion 42 is pivoted to either the first or second contact position, the detent member 74 contacts either the first indicating surface 175b or the second indicating surface 175c that are located on opposite sides of the slit 175a. The center of the slit 175a forms a rest position for the detent member 74. Thus, the rider can know that a shift operation has occurred.

As used herein, the terms "forward, rearward, upward, above, downward, below and transverse" refer to those directions of a bicycle in its normal riding is position. Accordingly, these terms, as utilized to describe the present invention in the claims, should be interpreted relative to the bicycle 10 in its normal riding position.

The terms of degree such as "substantially", "about" and "approximately" as used herein mean a reasonable amount of deviation of the modified term such that the end result is not significantly changed. These terms should be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. An electrical switch comprising:

a base portion;

a first electrical contact switch arranged relative to said base portion at a first location;

a toggle portion pivotally mounted to said base portion about a pivot axis between a toggle neutral position where said toggle portion is spaced from said first electrical contact switch and a first contact position where said toggle portion contacts said first electrical contact switch, said toggle portion having an upper operating surface, a lower switch contacting surface and a first end surface disposed between said upper operating surface and said lower switch contacting surface, said lower switch contacting surface being arranged to contact said first electrical contact switch upon movement of said toggle portion to said first contact position; and a clicking mechanism operatively formed between said base portion and said first end surface of said toggle portion to indicate movement of said toggle portion from at least one of said toggle neutral position and said first contact position, said electrical switch being configured and arranged to urge said toggle portion back to said toggle neutral position when said toggle portion is pivoted to said first contact position.

2. The electrical switch according to claim 1, further comprising a second electrical contact switch arranged relative to said base portion at a second location such that said lower switch contacting surface contacts said second electrical contact switch when said toggle portion is pivoted from said toggle neutral position to a second contact position.

3. The electrical switch according to claim 2, wherein said first and second locations of said first and second electrical contact switches are located on opposite sides of said pivot axis such that said toggle portion is pivoted in opposite rotational directions to selectively contact said first and second electrical contact switches, respectively.

4. The electrical switch according to claim 3, further comprising a biasing element operatively coupled between said base portion and said toggle portion to urge said toggle portion to said toggle neutral position.

5. The electrical switch according to claim 4, wherein said base portion has a first wall and a second wall at least partially defining a toggle receiving area;

said first and second electrical contact switches are disposed along said first wall; and said first end surface of said toggle portion faces said second wall of said base portion.

6. The electrical switch according to claim 4, wherein said clicking mechanism includes a detent member, a clicking member and a biasing member operatively urging said detent member into engagement with said clicking member.

7. The electrical switch according to claim 6, wherein said detent member is movably coupled to one of said base portion and said toggle portion, said clicking member is fixedly coupled to the other of said base portion and said toggle portion.

8. The electrical switch according to claim 7, wherein said clicking member has first and second indicating surfaces located on opposite sides of a recess forming a rest position for said detent member, said first and second indicating surfaces contacting said detent member, respectively, when said toggle portion is pivoted from said toggle neutral position to said first and second contact positions, respectively.

9. The electrical switch according to claim 4, further comprising a third electrical contact switch coupled to said base portion at a third location; and a button portion movably coupled to said toggle portion between a button neutral position where said button portion is spaced from said third electrical contact switch and a third contact position where said button portion contacts said third electrical contact switch.

10. The electrical switch according to claim 9, wherein said button portion moves in a linear direction relative to said toggle portion between said button neutral position and said third contact position.

11. The electrical switch according to claim 9, wherein said button portion is located above said pivot axis of said toggle portion and moves in a substantially perpendicular direction relative to said pivot axis of said toggle portion between said button neutral position and said third contact position.

12. The electrical switch according to claim 11, wherein said toggle portion is pivotally mounted to said base portion by a pair of separate pivot members that extend between said toggle portion and said base portion.

13. An electrical switch comprising:

a base portion;

a first electrical contact switch arranged relative to said base portion at a first location;

a second electrical contact switch arranged relative to said base portion at a second location;

a third electrical contact switch arranged relative to said base portion at a third location;

a toggle portion pivotally mounted to said base portion about a pivot axis between a toggle neutral position where said toggle portion is spaced from said first and second electrical contact switches, a first contact position where said toggle portion contacts said first electrical contact switch and a second contact position where said toggle portion contacts said second electrical contact switch; and a button portion movably coupled to said toggle portion between a button neutral position where said button portion is spaced from said third electrical contact switch and a third contact position where said button portion contacts said third electrical contact switch, said toggle portion being pivotally mounted to said base portion by a pair of separate pivot members that extend between said toggle portion and said base portion, said base portion and said toggle portion being configured and arranged to form a switch receiving space located between the pivot members and along the pivot axis, said third electrical contact switch being located in said switch receiving space between the pivot members.

14. The electrical switch according to claim 1, wherein said toggle portion is pivotally mounted to said base portion by a pivot pin that extends through said toggle portion with first and second ends being received in openings in said base portion.

15. The electrical switch according to claim 1, wherein
said toggle portion is pivotally mounted to said base portion by a pair of separate pivot members that extend between said toggle portion and said base portion.

16. The electrical switch according to claim 13, wherein
said first and second locations of said first and second electrical contact switches are located on opposite sides of said pivot axis such that said toggle portion is pivoted in opposite rotational directions to selectively contact said first and second electrical contact switches, respectively.

17. The electrical switch according to claim 13, further comprising
a biasing element operatively coupled between said base portion and said toggle portion to urge said toggle portion to said toggle neutral position.

18. The electrical switch according to claim 13, further comprising
a clicking mechanism operatively coupled between said base portion and said toggle portion to indicate said toggle neutral position and said first contact position.

19. The electrical switch according to claim 18, wherein
said toggle portion has an operating surface, a switch contacting surface, a first end surface located at a first end of said operating surface and said switch contacting surface, and a second end surface located at a second end of said operating surface and said switch contacting surface,
said switch contacting surface is arranged to contact said first and second electrical contact switches upon movement of said toggle portion to one of said first and second contact positions,
said pivot axis is located in a central section of said toggle portion between said first and second end surfaces, and
said clicking mechanism is located at one of said first and second end surfaces of said toggle portion.

20. The electrical switch according to claim 18, wherein
said clicking mechanism includes a detent member, a clicking member and a biasing member operatively urging said detent member into engagement with said clicking member.

21. The electrical switch according to claim 20, wherein
said detent member is movably coupled to one of said base portion and said toggle portion, said clicking member is fixedly coupled to the other of said base portion and said toggle portion.

22. The electrical switch according to claim 21, wherein
said clicking member has first and second indicating surfaces located on opposite sides of a recess forming a rest position for said detent member, said first and second indicating surfaces contacting said detent member, respectively, when said toggle portion is pivoted from said toggle neutral position to said first and second contact positions, respectively.

23. The electrical switch according to claim 13, wherein
said button portion moves in a linear direction relative to said toggle portion between said button neutral position and said third contact position.

24. The electrical switch according to claim 23, wherein
said button portion is located above said pivot axis of said toggle portion and moves in a substantially perpendicular direction relative to said pivot axis of said toggle portion between said button neutral position and said third contact position.

25. An electrically controlled bicycle shifting assembly, comprising:
a bicycle shift device configured to move between at least two shift positions;
a control unit operatively coupled to said shift device to control movement of said shift device between at least two shift positions; and
an operating device operatively coupled to said control unit to input a shift signal, said operating device including
a base portion;
a first electrical contact switch arranged relative to said base portion at a first location;
a toggle portion pivotally mounted to said base portion about a pivot axis between a toggle neutral position where said toggle portion is spaced from said first electrical contact switch and a first contact position where said toggle portion contacts said first electrical contact switch, said toggle portion having an upper operating surface, a lower switch contacting surface and a first end surface disposed between said upper operating surface and said lower switch contacting surface, said lower switch contacting surface being arranged to contact said first electrical contact switch upon movement of said toggle portion to said first contact position; and
a clicking mechanism operatively formed between said base portion and said toggle portion to indicate movement of said toggle portion from at least one of said toggle neutral position and said first contact position,
said operating device being configured and arranged to urge said toggle portion back to said toggle neutral position when said toggle portion is pivoted to said first contact position.

26. The electrically controlled bicycle shifting assembly according to claim 25, wherein
said operating device further includes a second electrical contact switch coupled to said base portion at a second location such that said toggle portion contacts said second electrical contact switch when said toggle portion is pivoted from said toggle neutral position to a second contact position.

27. The electrically controlled bicycle shifting assembly according to claim 26, wherein
said operating device further includes a third electrical contact switch coupled to said base portion at a third location; and a button portion movably coupled to said toggle portion between a button neutral position where said button portion is spaced from said third electrical contact switch and a third contact position where said button portion contacts said third electrical contact switch.

28. An electrically controlled bicycle shifting assembly, comprising:
a bicycle shift device configured to move between at least two shift positions;
a control unit operatively coupled to said shift device to control movement of said shift device between at least two shift positions; and
an operating device operatively coupled to said control unit to input a shift signal, said operating device including
a base portion;
a first electrical contact switch arranged relative to said base portion at a first location;
a toggle portion pivotally mounted to said base portion about a pivot axis between a toggle neutral position where said toggle portion is spaced from said first electrical contact switch and a first contact position where said toggle portion contacts said first electrical contact switch, said toggle portion having an upper operating surface, a lower switch contacting surface and a first end surface disposed between said upper operating surface and said lower switch contacting surface, said lower switch contacting surface being arranged to contact said first electrical contact switch upon movement of said toggle portion to said first contact position; and a clicking mechanism operatively formed between said base portion and said toggle portion to indicate movement of said toggle portion from at least one of said toggle neutral position and said first contact position, said operating device further including a second electrical contact switch coupled to said base portion at a second location such that said toggle portion contacts said second electrical contact switch when said toggle portion is pivoted from said toggle neutral position to a second contact position, said operating device further including a third electrical contact switch coupled to said base portion at a third location; and a button portion movably coupled to said toggle portion between a button neutral position where said button portion is spaced from said third electrical contact switch and a third contact position where said button portion contacts said third electrical contact switch, said first electrical contact switch controlling movement of said shift device in a first shifting direction, said second electrical contact switch controlling movement of said shift device in a second shifting direction that is opposite to said first shifting direction, and said third electrical contact switch changing a shifting mode of said control unit of said electrically controlled bicycle shifting assembly.

29. An electrically controlled bicycle shifting assembly, comprising:

a bicycle shift device configured to move between at least two shift positions;

a control unit operatively coupled to said shift device to control movement of said shift device between at least two shift positions; and an operating device operatively coupled to said control unit to input a shift signal, said operating device including a base portion;

a first electrical contact switch arranged relative to said base portion at a first location;

a toggle portion pivotally mounted to said base portion about a pivot axis between a toggle neutral position where said toggle portion is spaced from said first electrical contact switch and a first contact position where said toggle portion contacts said first electrical contact switch, said toggle portion having an upper operating surface, a lower switch contacting surface and a first end surface disposed between said upper operating surface and said lower switch contacting surface, said lower switch contacting surface being arranged to contact said first electrical contact switch upon movement of said toggle portion to said first contact position; and a clicking mechanism operatively formed between said base portion and said toggle portion to indicate movement of said toggle portion from at least one of said toggle neutral position and said first contact position, said operating device further including a second electrical contact switch coupled to said base portion at a second location such that said toggle portion contacts said second electrical contact switch when said toggle portion is pivoted from said toggle neutral position to a second contact position, said operating device further including a third electrical contact switch coupled to said base portion at a third location; and a button portion movably coupled to said toggle portion between a button neutral position where said button portion is spaced from said third electrical contact switch and a third contact position where said button portion contacts said third electrical contact switch, said first electrical contact switch controlling movement of said shift device in a first shifting direction, said second electrical contact switch controlling movement of said shift device in a second shifting direction that is opposite to said first shifting direction, and said third electrical contact switch controlling stiffness of a suspension assembly.

30. An electrically controlled bicycle shifting assembly, comprising:

a bicycle shift device configured to move between at least two shift positions;

a control unit operatively coupled to said shift device to control movement of said shift device between at least two shift positions; and an operating device operatively coupled to said control unit to input a shift signal, said operating device including a base portion;

a first electrical contact switch arranged relative to said base portion at a first location;

a second electrical contact switch arranged relative to said base portion at a second location;

a third electrical contact switch arranged relative to said base portion at a third location;

a toggle portion pivotally mounted to said base portion about a pivot axis between a toggle neutral position where said toggle portion is spaced from said first and second electrical contact switches, a first contact position where said toggle portion contacts said first electrical contact switch and a second contact position where said toggle portion contacts said second electrical contact switch; and a button portion movably coupled to said toggle portion between a button neutral position where said button portion is spaced from said third electrical contact switch and a third contact position where said button portion contacts said third electrical contact switch, said toggle portion being pivotally mounted to said base portion by a pair of separate pivot members that extend between said to toggle portion and said base portion, said base portion and said toggle portion being configured and arranged to form a switch receiving space located between the pivot members and along the pivot axis, said third electrical contact switch being located in said switch receiving space between the pivot members.

31. An electrically controlled bicycle shifting assembly, comprising:
   a bicycle shift device configured to move between at least two shift positions;
   a control unit operatively coupled to said shift device to control movement of said shift device between at least two shift positions; and
   an operating device operatively coupled to said control unit to input a shift signal, said operating device including
      a base portion;
      a first electrical contact switch arranged relative to said base portion at a first location;
      a second electrical contact switch arranged relative to said base portion at a second location;
      a third electrical contact switch arranged relative to said base portion at a third location;
      a toggle portion pivotally mounted to said base portion about a pivot axis between a toggle neutral position where said toggle portion is spaced from said first and second electrical contact switches, a first contact position where said toggle portion contacts said first electrical contact switch and a second contact position where said toggle portion contacts said second electrical contact switch; and
      a button portion movably coupled to said toggle portion between a button neutral position where said button portion is spaced from said third electrical contact switch and a third contact position where said button portion contacts said third electrical contact switch,
   said first electrical contact switch controlling movement of said shift device in a first shifting direction,
   said second electrical contact switch controlling movement of said shift device in a second shifting direction that is opposite to said first shifting direction, and
   said third electrical contact switch changing a shifting mode of said control unit of said electrically controlled bicycle shifting assembly.

32. An electrically controlled bicycle shifting assembly, comprising:
   a bicycle shift device configured to move between at least two shift positions;
   a control unit operatively coupled to said shift device to control movement of said shift device between at least two shift positions; and
   an operating device operatively coupled to said control unit to input a shift signal, said operating device including
      a base portion;
      a first electrical contact switch arranged relative to said base portion at a first location;
      a second electrical contact switch arranged relative to said base portion at a second location;
      a third electrical contact switch arranged relative to said base portion at a third portion;
      a toggle portion pivotally mounted to said base portion about a pivot axis between a tousle neutral position where said toggle portion is spaced from said first and second electrical contact switches, a first contact position where said toggle portion contacts said first electrical contact switch and a second contact position where said toggle portion contacts said second electrical contact switch; and
      a button portion movably coupled to said toggle portion between a button neutral position where said button portion is spaced from said third electrical contact switch and a third contact position where said button portion contacts said third electrical contact switch,
   said first electrical contact switch controlling movement of said shift device in a first shifting direction,
   said second electrical contact switch controlling movement of said shift device in a second shifting direction that is opposite to said first shifting direction, and
   said third electrical contact switch controlling stiffness of a suspension assembly.

* * * * *